United States Patent Office 3,705,941
Patented Dec. 12, 1972

3,705,941
VAPORIZABLE INSECTICIDE COMPOSITION
Claude Hennart, Seraincourt, Georges Martin, Saint-Benoit, Jean-Pierre Mandon, Poitiers, and Bernard Rabussier, Avanton, France, assignors to Ciba-Geigy AG, Basel, Switzerland
No Drawing. Filed June 16, 1969, Ser. No. 833,665
Claims priority, application France, June 21, 1968, 156,025; Feb. 12, 1969, 6903313; Mar. 12, 1969, 6906859, 6906860, 6906861, 6906862
Int. Cl. A01n 9/36
U.S. Cl. 424—219
28 Claims

ABSTRACT OF THE DISCLOSURE

Liquid hydrophobic compositions usable in an evaporator for diffusing vapors of active insecticidal substances into the atmosphere are described. The compositions comprise (A) at least one phosphoric acid ester- or thionophosphoric acid ester-insecticide as active ingredient,
(B) at least one saturated hydrocarbon which is liquid at ambient temperature, as principal solvent, and
(C) at least one organic co-solvent which is soluble in the principal solvent and is capable of dissolving per liter an insecticidally effective amount of component (A);

the amounts of (A), (B) and (C) being so proportioned that they are equal or approximately equal to the proportions of these components which exist in the vapor mixture which evaporates from the composition by way of an evaporator into the surrounding atmosphere, the co-solvent being chosen from solid materials of low melting point and liquid materials, both being soluble in the principal solvent and possessing a boiling point at atmospheric pressure of 100–320° C. and each of the principal solvent and the co-solvent having a vapor pressure at 20° C. of 0.01–30 torr. 2,2-dichlorovinyl dimethyl phosphate (DDVP) is a preferred insecticide in these compositions.

The present invention relates to liquid hydrophobic compositions comprising phosphoric or thionophosphoric esters as active insecticidal materials, as well as processes for producing such compositions.

Such compositions are more particularly useful in permanent insecticidal apparatus called wick evaporators, which slowly release insecticide vapors into the atmosphere to combat noxious or undesirable insects such as flies, mosquitos, gnats, cockroaches, wasps, fleas, bugs, ants, mites etc.

It is known to evaporate insecticidal phosphoric esters dispersed, for example, in a solid solution in polyvinyl chloride.

With this mode of insecticide release, the daily evaporation of the active substance is not constant; it decreases regularly as the usage is prolonged; as a result, the efficacy varies with time, and it becomes progressively weaker, becoming zero well before the evaporation of the active substance contained in the solid solution is complete.

To avoid this disadvantage, it has been attempted to increase the quantity of active substance introduced into the polyvinyl chloride resin, the time of efficacy can therefore be prolonged, but in return the rate of evaporation which is greatly increased above the required level during the first few days of use can reach values which are no longer harmless, and can be very toxic, to mammals, and particularly to human beings, when such use takes place in a closed room.

This decrease of the rate of evaporation of the active substance makes the use of the aforesaid compositions uneconomic, as more than half the phosphoric ester used is still present when the efficacy of the composition has become practically nil.

It is likewise known to use an evaporator apparatus in which a porous or fibrous material, such as an agglomeration of organic and/or mineral fibres, or a permeable ceramic, can be fed by a volatile liquid on one part of its surface while the liquid gradually evaporates through the other part in contact with the atmosphere. When the volatile liquid is a phosphoric ester, then certain of these esters, mainly those of greatest insecticidal efficacy, have the disadvantage of hydrolising rapidly if they are exposed to the ambient air over a large surface. Such is the case if the esters are used in the pure state in a wick evaporator apparatus; they take up the humidity in the atmosphere very rapidly and are thus very rapidly hydrolysed; it has been found that in this case the hydrolysis does not stop at the level of the evaporation surface, but affects the contents of the reservoir to a large degree.

This disadvantage must be met by use of a correspondingly increased amount of active substance, or, without such increase, it leads to a greatly diminished time of efficacy. In addition, the accumulation of decomposition products on the evaporation surface disturbs the regularity of the evaporation.

Stabilizers such as, for example, epoxidized compounds or polyamines, have been recommended with a view to protecting the phosphoric esters from hydrolysis. However, these stabilizers are in general only slightly volatile and can thus be used only in small quantities to avoid their accumulation on the wick; the efficacy of these stabilizers is accordingly reduced. It has been found that above a maximum limit of 3%, the accumulation of these stabilizers on the evaporative surface generally gives rise to a rapid decrease in the rate of evaporation.

An apparently simple method of avoiding or substantially reducing hydrolysis of phosphoric esters consists in using solutions of these esters in hydrocarbons; all the same, the unsaturated hydrocarbons are unsuited, on account of their high toxicity and disagreeable odour, to be used as the sole solvent. The saturated hydrocarbons are not toxic, but possess much too weak a solvent power so that their use in a wick evaporator device would give too weak release of insecticide vapor to be efficacious, or would necessitate a reservoir and an evaporation surface of exaggerated dimensions.

It has been found that completely hydrophobic solutions of phosphoric or thionophosphoric of sufficiently high concentration can be obtained by adding to the solution of such ester in a saturated hydrocarbon solvent a relatively small amount of certain co-solvents (or stabilizers) which are described in detail further below. The hydrophobic properties of such solutions are completely satisfactory, even in the case where the co-solvent is itself very hydrophilic.

It is an object of the invention to provide liquid hydrophobic compositions which will satisfy the following requirement:

(1) permitting their use in devices diffusing into the atmosphere, permanently, insecticidal vapors, without risk of premature decomposition, more particularly of the active material
(2) permitting as complete evaporation as possible of the active substance used
(3) permitting a regular and constant evaporation and therefore an insecticidal efficiency constant in time.

These objects are attained by the liquid hydrophobic compositions provided by the invention. These compositions are characterized in that they contain, as essential components:

(a) at least one insecticidal phosphoric or thionophosphoric ester as active material
(b) at least one saturated hydrocarbon liquid at ambient temperature as principal solvent
(c) at least one organic co-solvent soluble in the principal solvent and having good solvent power toward the compound (a).

Compositions according to the invention can contain up to 60% of active substance calculated on the weight of the composition. Preferably the proportion of active substance is between 3 and 25% based on the weight of the composition.

These compositions can contain up to 40% of co-solvent calculated on the weight of the composition. Preferably, this proportion is between 1 and 20% based on the weight of the composition. Of course, a sufficient amount of the principal solvent must always be present in order to guarantee, jointly with the co-solvent present in the above-given limits, a complete dissolution of all of the active substance.

The compositions envisaged by the present invention thus contain their components in proportions equal to/or near those existing in the mixture which actually evaporates on the evaporation surface of the device in which they are contained.

For, the following surprising phenomenon has been discovered:

When any solution is placed in a device of which the evaporation surface is constituted by a porous or fibrous substance such as a wick, the mixture which passes into the gaseous phase at the surface of that substance is not perforce the same as that which constitutes the solution used.

We have found that, in order to achieve that object, the content of each of the constituents of the solution must be within the limits of the amounts given below; otherwise the concentration of one at least of these constituents increases progressively as the evaporation proceeds, and a time arrives when the solution consists only of this sole constituent. This evolution in the composition of the insecticidal solution is particularly awkard when this solution becomes enriched with phosphoric or thionophosphoric esters. Because of their well known toxic nature, their presence in a concentrated state in the wick evaporator is, in effect, dangerous for the user. Conversely, the concentration of one of the constituents can diminish continuously as the evaporation proceeds, and a time-will arrive when this constituent no longer exists in the solution; if this constituent is the active insecticidal material, the device then loses all efficacy.

The phenomena just described do not take place in the compositions according to the invention of which the constituents are present in suitable proportions, as will be explained hereinafter. It is one of the advantages of the invention that one can obtain at will, in a controlled fashion, in a particular case, for example, that the solution remaining on the wick of the evaporator, at the end of use, contains no more active material, thus realising an extra economy and/or avoiding that the evaporator, thrown away after use and handled by a child, could be toxic thereto; this object is attained by using a solution poorer in active material than in the proportions according to the invention, depending on the absorptive capacity of the wick.

The different constituents of the compositions of the invention will now be described in detail.

The active substance comprises at least one phosphoric or thionophosphoric ester known for its weak stability in a humid atmosphere; such an ester is, for example, one of those defined by the general formula 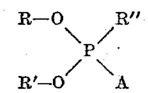 (I)

in which A is oxygen or sulphur, R and R′ are the same or different alkyl residues, and R″ is one of the following two groups:

(a)

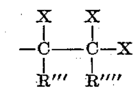

in which R‴ and R⁗ are the same or different and are each hydrogen, halogen or alkyl, and X is halogen, and (b)

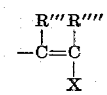

in which R‴, R⁗ and X have the meanings just assigned.

As non-limitative examples of esters corresponding to the general formula given, there can be noted the following phosphoric or thionophosphoric esters:

2,2-dichlorovinyl dimethyl phosphate
2,2-dichlorovinyl diethyl phosphate
2,2-dichlorovinyl dipropyl phosphate
2,2-dichlorovinyl dibutyl phosphate
2,2-dibromovinyl dimethyl phosphate
2,2-dibromovinyl diethyl phosphate
2,2-dibromovinyl dipropyl phosphate
2-bromo 2-chlorovinyl dimethyl phosphate
2-bromo-2-chlorovinyl diethyl phosphate
2,2-dichlorovinyl ethylmethyl phosphate
1,2-dibromo-2,2-dichloroethyl dimethyl phosphate
1,2-dibromo-2,2-dichloroethyl diethyl phosphate
1-bromo-2,2,2-trichloroethyl dimethyl phosphate
1-bromo-2,2,2-trichloroethyl diethyl phosphate
1,2,2,2-tetrabromoethyl dimethyl phosphate
1,2,2,2-tetrabromoethyl diethyl phosphate
1,2-dibromo-2,2-dichloropropyl dimethyl phosphate
1,2-dibromo-2,2-dichloropropyl diethyl phosphate
2,2-dichloro-2-methylvinyl dimethyl phosphate
2,2-dichloro-2-methylvinyl diethyl phosphate, and
the corresponding thionophosphates For the purposes of the present invention, the preferred esters of those just quoted are those in which the group R″ is a $—CH=CCl_2$ group, i.e. the 2,2-dichlorovinyl dialkyl phosphates; in this later group is 2,2-dichlorovinyl dimethyl phosphate, known as DDVP and Dichlorvos.

The principal solvents are saturated hydrocarbons of the aliphatic series, straight and branched chain, and of the alicyclic series.

These solvents can be pure products or mixtures, having a vapour pressure at 20° C. between 0.001 and 30 torr, preferably between 0.01 and 5 torr; these solvents correspond generally to products distilling, at atmospheric pressure, between 100 and 320° C., preferably between 140 and 270° C.

Among the solvents fulfilling the criteria noted, one can give the following examples:

|  | Distillation point, °C. | Vapour pressure at 20° C., Torr |
|---|---|---|
| n-Nonane | 151 | 3.5 |
| n-Decane | 174 | 1.3 |
| n-Undecane | 197 | 0.45 |
| n-Dodecane | 216 | 0.15 |
| n-Tridecane | 234 | 0.08 |
| n-Tetradecane | 252 | 0.02 |
| 2,6-dimethyl-octane | 159 | 2.5 |
| White spirit | 150/205 | 0.2/3.5 |
| "Isopar L" a | 189/205 | 0.2/0.6 |
| "Soltrol 130" b | 176/208 | 0.2/1.2 |
| "Soltrol 160" b | 189/205 | 0.2/0.6 |
| "Aliphatic solvent 55" c | 169/195 | 0.5/1.6 |
| Illuminating oil | 160/230 | 0.1/2.6 |
| Kerosene | 190/235 | 0.08/0.6 |
| c-Methane | 171 | 2.0 |
| m-Methane | 158 | 2.0 |
| p-Methane | 169 | 2.0 |
| Decalin | 187/195 | 0.9/3 |
| 3,3,4,4-tetramethylhexane | 170 | 1.5 |
| Isoamylcyclohexane | 193 | 1.0 |
| "Solpar 195/230" d | 194/225 | 0.1/0.5 |
| "Solnap" e | 150/195 | 0.5/3.5 |
| "Solvent 30" f | 160/200 | 0.1/2.5 |
| Amsco Solvent 140 g | 186/206 | 0.2/1.0 |
| Apco Solvent 140 h | 181/202 | 0.3/1.1 |
| Odourless Atlantic Solvent i | 179/201 | 0.3/1.2 | a Mixture of synthetic branched aliphatic hydrocarbons, constituted by a mixture of decanes, undecanes and dodecanes, produced by the French company, Esso Standard of Paris, having about 11 carbon atoms.
b Mixture similar to Isopar L manufactured by the U.S. company, Phillips Petroleum Co. of Bartlesville, Okla.
c Mixture of hydrocarbons of petroleum origin manufactured by the French company, Esso Standard of Paris.
d Mixture of normal paraffin hydrocarbons produced by the British company, British Petroleum Chemicals Ltd. of London.
e Mixture of normal paraffin hydrocarbons produced by the British company, British Petroleum Chemicals Ltd. of London.
f Mixture of normal paraffin hydrocarbons produced by the Swiss company, Schweizerische Sprengstoff-fabrik of Dottikon.
g h Mixture of hydrocarbons of petroleum origin manufactured by the U.S. company, Apco Oil Corporation of Oklahoma City, Okla.
i Mixture of hydrocarbons of petroleum origin produced by the U.S. company, Atlantic Refining Co., of Philadelphia, Pa.

The co-solvents envisaged by the invention are liquids or solids having a low melting point.

Their vapour pressure at 20° C. is between 0.001 and 30 torr, and preferably between 0.01 and 5 torr. This corresponds generally to products distilling at atmospheric pressure, between 100 and 320° C., preferably between 140 and 270° C.

The co-solvents belong to the groups hereafter noted, for each of which non-limitative examples have been given.

Aromatic hydrocarbons

The preferred compounds correspond to the following general formula

in which R is hydrogen or alkyl of 1-5 carbon atoms and R' represents one to three alkyl groups containing 1-4 carbon atoms located at any position on the benzene nucleus. R and R' can also represent together a saturated divalent hydrocarbon group containing 1-4 carbon atoms.

There are, for example mesitylene, tert-butylbenzene pseudocumene, isobutylbenzene, sec-butylbenzene, n-butylbenzene, p-propyl-toluene, p-cymene, 1,4-diethyl benzene, p-tert-butyl-toluene, p-diisopropylbenzene, tetraline, durene, isodurene, "Hi-Sol 15" (a'), "Hi-Sol 70" (b'), "Panasol RX-22" (c'), Amsco Solvent D (d'), Amsco Solvent F (e'), Solvarex 10 (f'), Solvesso 150 (g').

Halogenated aliphatic hydrocarbons

The preferred compounds contain 6-14 carbon atoms in straight or branched chain and one atom of chlorine or bromine, or 2-8 carbon atoms in straight or branched chain and 2-6 chlorine atoms or 2-4 bromine atoms, one to three of these latter being replaceable with 1-3 chlorine atoms.

There are, for example, 1 - chloro-octane, 1 - chloro-nonane, 1 - chlorodecane, 1 - chloroundecane, 1-chlorododecane, 1 - bromoheptane, 1 - bromo-octane, 1,3-dibromopropane, 1,2 - dibromobutane, 1,2,3 - tribromopropane, hexachlorethane.

Halogenated aromatic hydrocarbons

The preferred compounds correspond to the following general formula

in which R is hydrogen or alkyl of 1-5 carbon atoms and R'' represents one to three atoms of chlorine and/or bromine.

There are, for example: 1,2-dichlorobenzene, 2-bromotoluene, 4-bromotoluene, chloro - 4 - ethyl benzene, dibromoethylbenzene (h').

Monoethers

The preferred compounds correspond to the following general formula:

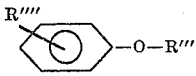

in which R''' is alkyl of 1-6 carbon atoms and R'''' is halogen such as chlorine or bromine or an alkyl group of 1-4 carbon atoms.

There is for example: phenetol, hormophenetol, o-chloranisole, p-chloranisole, 4-methoxy toluene.

Diethers

The preferred compounds correspond to the following general formula

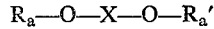

wherein $R_a$ and $R_a'$ are the same or different and are alkyl of 1-6 carbon atoms; X represents a divalent hydrocarbon group containing 1-6 carbon atoms in straight or branched chain or is a saturated or unsaturated aromatic ring.

There are, for example: 3,6-dioxa octane (j'), 2,5-dioxa octane, 3,6-dioxanonane, 2,5-dioxanonane, 4,7 - dioxadecane, 3,6-dioxadecane, 4,7-dioxaundecane, 5,9-dioxadodecane (m'), veratrol, 1,3-dimethoxybenzene, 1,4-dimethoxybenzene.

Triethers

The preferred compounds correspond to the following general formula

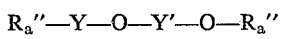

wherein $R_a''$ and $R_a'''$ are the same or different and are alkyl of 1-5 carbon atoms; Y and Y' are the same or different and are divalent hydrocarbon groups containing 1-3 carbon atoms in straight or branched chain.

The preferred compounds can also correspond to the following general formula:

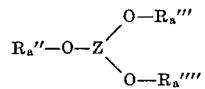

wherein R'', R''' and R'''' are the same or different and are alkyl of 1-5 carbon atoms; Z represents a trivalent hydrocarbon group containing 1-3 carbon atoms in branched or straight chain or is a benzene nucleus.

There are, for example:

2,5,8-trioxanonane (n'),
2,5,8-trioxadecane,
2,5,8-trioxaundecane,
3,6,9-trioxanundecane (p'),
4,8-dimethyl-3,6,9-trioxaundecane (q'),
2,5,8-trioxadodecane,
3,6,9-trioxadodecane,
3,6,9-trioxatridecane (k'),
5,8,11-trioxapentadecane (r'),
1,3,5-trimethoxybenzene,
1,2,3-trimethoxybenzene.

Tetraethers

The preferred compounds correspond to the following general formula:

$$R_b—O—Y—O—Y'—O—Y''—O—R_b'$$

in which $R_b$ and $R_b'$ are the same or different and are alkyl of 1–4 carbon atoms, Y, Y' and Y'' are the same or different and are divalent hydrocarbon groups of 1–3 carbon atoms in straight or branched chain.

There are, for example: 2,5,8,11-tetraoxadodecane (s'), 3,6,9,12-tetraoxatetradecane.

Pentaethers

The preferred compounds correspond to the following general formula $$R_b''—O—Y—O—Y'—O—Y''—O—Y'''—O—R_b'''$$

in which $R_b''$ and $R_b'''$ are the same or different and are alkyl of 1–3 carbon atoms, Y, Y', Y'' and Y''' are the same or different and are divalent hydrocarbon groups of 1–3 carbon atoms in straight or branched chain.

There is for example: 2,5,8,11,14 - pentaoxapentadecane (t').

Heterocyclic compounds

The preferred compounds correspond to the following general formula

wherein X' is O or S and A represents a divalent group being one of butadiene-1,3-diyl, 1,4-butanediyl, 3-thia-1,5-pentanediyl, 2-oxa-1,5-pentanediyl or 3-oxa-1,5-pentanediyl, which group can itself carry a substituent phenyl residue and/or 1–4 alkyl substituents each of 1–5 carbon atoms.

These are for example:
2,2-diethylmetadioxane,
2,2-dibutylmetadioxane,
2,3,5,6-tetramethylmetadioxane,
5-ethyl-4-propylmetadioxane,
4-phenyl-4-methylmetadioxane,
2-methyl-5-phenylmetadioxane,
2,3-dimethyl-5-phenylmetadioxane,
2-phenylmetadioxane,
4-phenylmetadioxane,
5-phenylmetadioxane,
2,3-dichloroparadioxane,
2-propylthiophene,
2-butylthiophene,
parathioxane.

Acyclic hydroxy compounds

The preferred compounds correspond to the following general formula $$R_c—A'—OH$$

wherein $R_c$ represents hydrogen or alkoxy of 1–6 carbon atoms or alkoxyalkoxy of 2–6 carbon atoms, A' is a straight or branched chain hydrocarbon group of 1–6 carbon atoms, this number being able to be raised to 14 carbon atoms when $R_c$ is hydrogen.

There are for example: 2-butoxyethanol, 1-octanol, 2-octanol, 1-heptanol, 2-ethyl - 1 - hexanol, 3,6-dioxa-1-octanol, 3,6-dioxa-1-nonanol, linalol, 3,7-dimethyl-1-octanol.

Alicyclic hydroxy compounds

The preferred compounds correspond to the following general formula

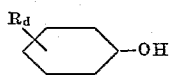

in which $R_d$ is hydrogen or one to four alkyl groups of 1–5 carbon atoms.

There are for example: 3-methylcyclohexanol, menthol, 3,3,5-trimethyl cyclohexanol

Aromatic hydroxy compounds

The preferred compounds correspond to the following general formula

wherein $R_d'$ is hydroxy or hydroxyalkyl of 1–5 carbon atoms or hydroxyalkoxy of 1–3 carbon atoms, and $R_d''$ is one to three atoms of chlorine and/or one to two alkyl groups of 1–4 carbon atoms.

There are for example: phenoxyethanol, 1-phenyl-2-propanol, metacresol, 2-chlorophenol, 2-chloroparacresol.

Heterocyclic hydroxy compounds

The preferred compounds correspond to the following general formula

in which X' is oxygen or sulphur and A'' represents a divalent group being 1,3-butadiene-1,4-diyl, 1,4-butanediyl, 2-thia-1,5-pentanediyl, 2-oxa-1,5-pentanediyl or 3-oxa-1,5-pentanediyl, which group may carry a hydroxy or hydroxymethyl substituent and, optionally, 1–3 substituent alkyl groups each of 1–5 carbon atoms.

These are for example:
2,4-dimethyl-6-metadioxanol,
2,4-diethyl-5-methyl-6-metadioxanol,
5-hydroxymethyl-4,4-dimethylmetadioxane,
4-hydroxymethyl-4,5-dimethylmetadioxane,
2-methyl-5-metadioxanol,
4-hydroxymethyl-2-methyl-(1,3)-dioxolane,
furfurylalcohol,
tetrahydrofurylalcohol.

Organic monoesters

The preferred compounds correspond to the following general formula

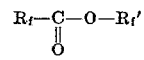

in which $R_f$ is hydrogen or acetonyl or alkyl of 1–13 carbon atoms, $R_f'$ is phenyl, cresyl, alkyl of 1–14 carbon atoms, alkenyl of 3–11 carbon atoms, cyclohexyl or alkylcyclohexyl in which the or each alkyl substituent contains 1–4 carbon atoms. $R_f'$ can also be the residue of a heterocyclic hydroxy compound such as defined above. The total number of carbon atoms in the ester is 5–16.

These are for example: hexylacetate, cyclohexyl acetate, heptylacetate, octylacetate, 2-methyl hexyl acetate, 2-methoxyethyl acetate, 2-ethoxyethylacetate, 2-butoxyethyl acetate, linalyl acetate, phenyl acetate, tetrahydrofurfuryl acetate, 2,4-dimethylmetadioxanyl (u'), hexyl propionate, cyclohexyl propionate, heptyl propionate, octyl propionate, phenyl propionate, butylbutyrate, isoamyl isovalerate, amylvalerate, methylheptanoate, ethyl heptanoate, methyl caprylate, ethyl caprylate, ethyl caproate, methyl caprate, ethyl caprate, methyl pelargonate, ethyl pelargonate, methyl acetylacetate, ethylacetylacetate.

Organic diesters

The preferred compounds are the esters formed between the diacids and the alcohols corresponding to the following Formula I, or the esters formed between the dialcohols and the monoacids of the following Formula II:

(I) 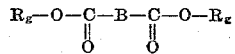

In this Formula I, B is a saturated divalent hydrocarbon group of 1–4 carbon atoms or is a direct bond between the two carbonyl groups, and $R_g$ is alkyl of 1-4 carbon atoms.

(II) $\quad R_g'-\underset{\underset{O}{\|}}{C}-O-B'-O-\underset{\underset{O}{\|}}{C}-R_g'$ In this Formula II, B' is a saturated divalent hydrocarbon group of 2-6 carbon atoms, and $R_g'$ is alkyl of 1-3 carbon atoms.

There are, for example: dimethyl adipate, diethyl succinate, dipropyl oxalate, diisopropyl oxalate, β-ethane diyl diacetate, β-propane diyl diacetate, γ-propane diyl diacetate, β-ethane diyl dipropionate.

Organic triesters

The preferred compounds are the esters formed between triols and mono acids corresponding to the following general formula:

$$R_g''-\underset{\underset{O}{\|}}{C}-O-B''\begin{matrix}O-\underset{\underset{O}{\|}}{C}-R_g''\\ \\ O-\underset{\underset{O}{\|}}{C}-R_g''\end{matrix}$$

in which B'' is a trivalent saturated hydrocarbon group of 3-6 carbon atoms and $R_g''$ is methyl or ethyl.

There is, for example, triacetine.

Acyclic ketones

The preferred compounds correspond to the following general formula:

$$R_h-\underset{\underset{O}{\|}}{C}-R_h'$$

in which $R_h$ is alkyl of 4-8 carbon atoms, acetonyl or acetylethyl, and $R_h'$ is alkyl of 1-6 carbon atoms.

There are, for example: 2-octanone, 5-nonanone, 3-nonanone, 2,6-dimethyl-4-heptanone, acetonylacetone.

Alicyclic ketones

The preferred compounds correspond to the following general formula:

[structure: cyclohexanone with R' substituent]

in which R' represents optionally one to three alkyl group of 1-4 carbon atoms. The bonds indicated in dotted lines are optional and can exist separately.

There are, for example: 2-methyl cyclohexanone, 3-methyl cyclohexanone, 4-methyl cyclohexanone, isophorone, 3,3,5-trimethyl cyclohexanone, fenchone, betathuyone.

Aromatic ketones

The preferred compounds correspond to the following general formula:

[structure: phenyl ring with $R_h''$ substituent and $-C(=O)-R_h'$ group]

in which $R_h'$ is alkyl of 1-6 carbon atoms and $R_h''$ is hydrogen or one to three alkyl groups of 1-5 carbon atoms, or one or two alkoxy groups of 1-3 carbon atoms.

There are, for example: acetophenone, propiophenone, pivalophenone, isobutyrophenone, 4-methyl acetophenone, 4-methoxyacetophenone.

Amides

The preferred compounds correspond to the following general formula:

$$R_m-N\begin{matrix}R_m'\\ \\ R_m''\end{matrix}$$

in which $R_m$ is alkanoyl of 1 or 2 carbon atoms, N,N-dimethylcarbamoyl, N,N-dimethyl carbamoyl, or N,N,N', N'-tetramethyl phosphorodiamidoyl and $R_m'$ and $R_m''$ are the same or different tnd are alkyl of 1-3 carbon atoms.

There are for example: N,N-dimethylformamide, N,N-diethylformamide, N,N-dimethylacetamide, hexamethylphosphatotriamide, tetramethylurea.

Nitriles

The preferred compounds correspond to the following general formula:

$$R_m'''-C\equiv N$$

in which $R_m'''$ is alkyl or chloroalkyl of 2-10 carbon atoms, phenyl, tolyl, benzyl, methoxycarbonylmethyl or ethoxy carbonylmethyl.

There are, for example: capronitrile, heptanonitrile, 3-chloropropionitrile, 4-chlorobutyronitrile, benzonitrile, tolunitriles, caprylonitrile, methyl cyanoacetate, ethyl cyanoacetate (a') mixture of aromatic hydrocarbons distilling between 177 and 216° C., produced by the U.S. company, R. J. Brown Company of St. Louis (Mo.).

(b') mixture of aromatic hydrocarbons distilling between 168 and 202° C. produced by the R. J. Brown Company noted above.

(c') mixture of aromatic hydrocarbons distilling between 186 and 211° C. produced by the U.S. company Amoco Chemicals Corporation of Chicago (Ill.).

(d') mixture of aromatic hydrocarbons distilling between 165 and 196° C. produced by the American Mineral Spirits Company already noted.

(e') mixture of aromatic hydrocarbons distilling between 177 and 204° C. produced by the American Mineral Spirits Company already noted.

(f') mixture of aromatic hydrocarbons distilling between 182 and 200° C. produced by Compagnie Francaise de Raffinage of Paris.

(g') mixture of aromatic hydrocarbons distilling between 187 and 212° C. produced by the French company, Esso Standard of Paris.

(h') isomeric mixture of dibrominated ethylbenzene produced under the trademark "Alkazene 12" by the U.S. company, Dow Chemical Company of Midland (Mich.).

(j') product known as diethylglycol produced by the U.S. company, Jefferson Chemical Company of Houston (Tex.).

(k') product known as diglycol-butyl ethyl ether produced by the U.S. company, Mercury Chemical Corporation of Metuchen (N.J.).

(m') product known as dibutylglycol produced by the U.S. company, McKessen & Robbins of New York.

(n') product known as diglyme, produced under the trademark "Polysol D2M" by the U.S. company, Olin Mathieson Chemical Corporation of New York, under the mark "Methyldioxitol" by the British company, Shell Chemicals Company of London, and under the name "Ether 141" by the U.S. company, Ansul Chemical Company of Marinette (Wis.).

(p') product known as diglycol diethylether produced under the trademark "Diethylcarbitol" by the U.S. company, Union Carbide Chemicals Company of New York.

(q') product known under the name of diisopropyleneglycol diethylether, produced under the trademark "Polysols P-2M," by the firm of Olin Mathieson Chemical Corporation noted above.

(r') product known under the name of diglycol dibutyl ether, produced under the trademark "Dibutylcarbitol" by the company, Union Carbide Chemicals Company already noted.

(s') product known as triglyme produced under the name "Ether 161" by the company, Ansul Chemical Company already noted.

(t') product known as tetraglyme produced under the name of "Ether 181" by the company, Ansul Chemical Company already noted.

(u') bactericidal product known as dimethoxane and produced under the trademark "Dioxine" by the U.S. company, Civaudan Corporation of New York.

The insecticidal compositions of the invention can optionally contain other materials added in order to obtain the necessary physical characteristics, with the reservation that these additive materials should be volatile in the conditions of use of the said compositions.

The additives are preferably complementary insecticides and or insect repellents usable in a proportion of 0.1–20% by weight of the composition, preferably 0.5–10%. For this, one can, for example, add 1,2,3,4,5,6-hexachlorocyclohexane, and more particularly its gamma isomer known as lindane, 1,4-dichlorobenzene, the trichlorobenzenes, the tetrachlorobenzenes, pentachlorobenzene, hexachlorobenzene, naphthalene, bromonaphthalene, the dichloronapthalines, aldrin and dimethylphthalate.

The additive materials can also include additional stabilising agents such as the epoxy or amino compounds used in small quantities, dyes, odorizing agents or deodorants, bactericides, germicides, or disinfectants; the stabilisers are used in a maximum proportion of 3% preferably 2%, and the other additional materials are used at a maximum proportion of 10%, preferably 5%.

The properties of the insecticidal compositions according to the invention have been studied in the course of experiments, of which the following examples are given:

EXPERIMENT A (1) There was used a wick evaporator constituted by a reservoir and a wick, one end of which extended to the base of the reservoir, the other end being joined to a felt disc having an evaporation surface of 38 cm.$^2$; the wick and the disc were formed of a felt of wool and cotton and the reservoir was charged with 80 gm. of technical DDVP, titrating at 97% to pure DDVP, and placed in a room in which the temperature was kept at 21°±1° C., the relative humidity being about 50°.

The water held by the pieces of felt was about 100 mg.

At the end of 4 weeks, there was measured the acidity formed by hydrolysis in the pieces of felt and in the remaining liquid; the potentiometric dosage curve showed that the acid formed was a mono acid corresponding well to the hydrolysis of a single function ester of DDVP (the absence of hydrochloric acid was also noted). Besides, it was proven that the acid formed is not volatile and that the quantity formed thus corresponded well to that of DDVP hydrolysis. It has been found, in this way, that the quantity of DDVP hydrolysed was equal to 4.9 g.

In deducing this value, the quantity destroyed by the water located in the wick, i.e. 0.1×221/18=1.2 gm., one can see that the hydrolysis caused by atmospheric humidity after 4 weeks use is 21.9−1.2=20.7 gm.

This experiment shows clearly that the use of an unprotected phosphoric ester in a wick evaporator is not possible on account of the substantial and rapid destruction of the active material by the action of atmospheric humidity.

(2) Wick evaporators as noted above were charged each with 200 gm. of a solution of DDVP (7 to 8%) in "Isopar L," 1-octanol (5%) serving as cosolvent. These apparatus were placed under the same conditions of temperature and hydrometry as those noted before.

The water content of the pieces of felt was about 100 mg.; that of the solution about 40 mg.

At the end of 12 weeks, the acidity was measured as in the preceding case and the following values found.

| Apparatus number: | Percent DDVP in solution | Weight of hydrolized DDVP (grams) |
|---|---|---|
| 1 | 7 | 1.5 |
| 2 | 7 | 1.7 |
| 3 | 7 | 1.5 |
| 4 | 7 | 1.7 |
| 5 | 7 | 1.6 |
| 6 | 7 | 1.4 |
| 7 | 8 | 1.6 |
| 8 | 8 | 2.4 |
| 9 | 8 | 1.7 |
| 10 | 8 | 2.2 |

Calculating the average of these values (1.75 g.) the quantity of DDVP destroyed by the water in the wick (1.2 g.) and in the solution (0.5 g.), it can be seen that the hydrolysis attributable to the atmospheric humidity, after 12 weeks, is practically zero.

These experiments bring out clearly the hydrophobic properties of the compounds of the invention and the advantage that they give compared to an unprotected phosphoric ester, as recommended by the invention.

(3) There were used evaporators as noted above but in which the felt disc presented an evaporative surface of 48 cm.$^2$, and of which the whole of the reservoir and felt disc were placed in a diffuser comprising a cylindrical box with a flat base 130 mm. diameter and of which the side wall was constituted by a metal grille extending 70 mm. high and with meshes corresponding to an optical transparency of 55%.

The reservoir of each evaporator was charged with 100 gm. of a composition as follows,

|  | Percent |
|---|---|
| Technical DDVP | 9.2 |
| 3,6,9-trioxa undecane | 5 |
| Isopar L | 85.8 |

The water content of the solvent was 7 mg., that of the pieces of felt being 70 mg. These evaporators, in functioning, were placed in a room of which the temperature was maintained at 21±1° C., the relative humidity being kept at 80±10.

At the end of 6 weeks, the acidity formed by hydrolysis was measured in the pieces of felt and in the remaining liquid. The following values were found:

| No. of apparatus: | Weight of hydrolyzed DDVP (m.g.) |
|---|---|
| 1 | 953 |
| 2 | 986 |
| 3 | 1002 |
| 4 | 998 |
| 5 | 984 |
| 6 | 987 |
| 7 | 832 |
| 8 | 1023 |

Working from the average of these values (958 mg.), the quantity of DDVP destroyed by water in the pieces of felt (860 mg.) and in the solution (86 mg.), it can be seen that the hydrolysis imputable to atmospheric humidity after 6 weeks in a medium of raised humidity, is practically zero. This result is surprising if one takes into account that the 3,6,9-trioxaundecane is miscible in all proportions with water; this experiment shows that the co-solvent can be hydrophilic, without, for this reason, the solution recommended by the invention losing its hydrophobic properties.

EXPERIMENT B

Evaporators were used consisting of a reservoir and a wick of a felt of wool and cotton of which one end is at the base of the reservoir, the other in the open air.

These reservoirs each received a different solution containing a content X percent of DDVP, and Y percent of co-solvent, in Isopar L used as principal solvent.

After a number of days of use N, the content Z percent of DDVP in the remaining solution contained in the reservoir of the evaporator and on the wick was measured. It was observed that an enriching or dilution of DDVP took place in the solution progressively with the evaporation, as indicated, for each case, in the following table:

During the same period, 5 specimens of a solid composition, available commercially and constituted each by a tablet on the basis of polyvinyl chloride and of DDVP, weighing, on average, 126 gms. and containing 24 gms. of technical DDVP, were suspended in the same room to allow the DDVP to evaporate.

The quantities evaporated were measured every 10 days by weighing.

The average of the weighings was calculated, each ten days, for the two types of evaporator apparatus.

The following table allows comparison of the figures so obtained.

| Weight of solution (gm.) | Initial concentration of DDVP (X percent) | Co-solvent | Y percent | Daily average evaporation (gm.) | Number of days, N | Final concentration of DDVP (Z percent) |
|---|---|---|---|---|---|---|
| 100 | 20 | Diisopropylbenzene | 40 | 2.83 | 15 | 29.2 |
| 200 | 10 | ....do.... | 30 | 2.04 | 30 | 15.3 |
| 200 | 10 | Isophorone | 20 | 3.31 | 30 | 11.5 |
| 200 | 10 | 1-heptanol | 5 | 2.39 | 30 | 11.5 |
| 200 | 10 | ....do.... | 5 | 2.26 | 15 | 10.5 |
| 100 | 20 | 1-octanol | 10 | 3.22 | 15 | 30.1 |
| 200 | 10 | ....do.... | 5 | 3.12 | 30 | 12.2 |
| 150 | 10 | 2-octanol | 5 | 2.70 | 30 | 12.9 |
| 100 | 8.7 | 3,6,9-trioxaundecane | 5 | 2.05 | 30 | 5.7 |
| 100 | 9.2 | ....do.... | 5 | 2.01 | 30 | 7.0 |
| 100 | 9.2 | 2,5,8,11-tetraoxadodecane. | 5 | 2.75 | 20 | 12.0 |
| 100 | 9.2 | 5,8,11-trioxapentadecane. | 3.5 | 2.25 | 20 | 10.9 |
| 100 | 9.2 | ....do.... | 5 | 2.45 | 20 | 10.0 |
| 100 | 8.5 | 1-chlorododecane | 5 | 2.28 | 25 | 7.5 |
| 100 | 8.0 | 2-dimethyl 6(4-meta-dioxanyl)acetate. | 5 | 3.01 | 15 | 10.1 |

These experiments show clearly the unexpected phenomenon of enrichment or dilution of DDVP in solutions of which the proportions of the ingredients are not carefully chosen.

EXPERIMENT C

The values shown in the table above allow the calculation of the concentration of DDVP in the evaporated portion of the solution, which is called "richness in the vapor phase" in what follows.

The richness in the vapor phase of a solution of 5% 1-octanol, the rest being formed of Isopar L is thus calculated as 7.5% of DDVP.

A solution containing these proportions was prepared and used to charge, at a rate of 160 gm. solution per reservoir, 5 evaporators having an evaporative surface in the open air of 38 cm.$^2$.

At the end of 90 days working in a room of which the temperature was kept at 21±1° C., there remained, on average, in each evaporator 45 gm. of solution, on which a quantitative analysis was carried out. This allowed the following figures to be obtained.

|  | Percent |
|---|---|
| DDVP | 7.5±0.4 |
| 2-octanol | 5.0±0.3 |

This shows that in the case where the proportions of the components are carefully chosen, the concentration of the solution stays the same.

EXPERIMENT D

For 90 days the evaporators provided as noted in Experiment C were put under observation. The quantities evaporated were determined every 10 days by weighing.

| Number of days: | Daily average evaporation | |
|---|---|---|
|  | Wick apparatus (gm.) | Commercial tablet (mg.) |
| 1 | 1.41 | 430 |
| 10 | 1.26 | 340 |
| 20 | 1.35 | 260 |
| 30 | 1.32 | 190 |
| 40 | 1.12 | 160 |
| 50 | 1.26 | 120 |
| 60 | 1.17 | 95 |
| 70 | 1.26 | 86 |
| 80 | 1.15 | 80 |
| 90 | 1.38 | 73 |

This example shows the constancy (at ± about 12%) of the evaporation rates of a wick dispenser using a composition of the invention, which is not true in the case of the commercial product chosen as a comparison.

EXPERIMENT E (1) A wick dispenser having an evaporation surface of 38 cm.$^2$ was filled with a solution like that defined in Experiment C.

Tests were carried out periodically on flies in a room of 80 m.$^3$ kept at a temperature of 25° C.; the flies were introduced into the room at the moment of placing the evaporator there.

The percentages of fallen flies (KD) was noted with respect to the elapsed time expressed in minutes.

The results of these tests are combined in the following table:

|  | KD 50 | KD 90 |
|---|---|---|
| Days: | | |
| 1 | 36 | 57 |
| 8 | 32 | 57 |
| 25 | 35 | 58 |
| 45 | 31 | 54 |
| 70 | 37 | 60 |
| 90 | 33 | 58 |
| Average | 34±3 | 57±3 |

(2) A wick evaporator was used as described in Experiment A3. The reservoir was loaded with 100 gms. of the solution given in this experiment. The content of 9.2% (in place of 10.6%) was chosen in order to reduce the waste of DDVP to a minimum, the quantity of solution absorbed by the pieces of felt, when the reservoir is empty, being about 13 gm. At this point, the solution practically no longer contains any DDVP.

The apparatus was placed in a room of which the temperature was kept at 21±2° C., the relative humidity being kept at 80±10.

In the course of the first week, the apparatus was placed in a normal living room of volume about 30 m.$^3$ of which the temperature was kept at 25±1° C. Domestic flies were introduced and the percentage of fallen flies (KD) was noted with respect to the time elapsed in minutes: the average results hereafter have been obtained with 10 experiments:

Minutes
KD 50 _____ 34
KD 90 _____ 57

The same test was repeated in the same conditions, at the end of 4 weeks; the following average results were recorded from 10 tries:

Minutes
KD 50 _____ 36
KD 90 _____ 60

The same test was repeated in the same conditions, at the end of 8 weeks; the following average results were recorded from 10 tries:

Minutes
KD 50 _____ 35
KD 90 _____ 58

The same test was repeated in the same conditions, at the end of 12 weeks; the following average results were recorded from 10 tries:

Minutes
KD 50 _____ 32
KD 90 _____ 61

The average KD 50 over the whole of the tests was 34 minutes with a deviation of ±2 minutes.

The average KD 90 over the whole of the tests was 59 minutes with a deviation of ±2 minutes.

These two experiments show the remarkable constancy with time of the insecticidal efficacy of the solutions recommended by the invention; for the percentage of fallen flies, the times necessary to obtain them only deviate 2 or 3 minutes with respect to the average time calculated.

These results are particularly astonishing in the case of the evaporator used in Experiment E-2 when one considers that this evaporator, containing a highly hydrophilic co-solvent, had remained for 12 weeks in an atmosphere of relative humidity as high as 80±10.

EXPERIMENT F

Wick evaporators were used such as described in Experiment A-1; the reservoir of each evaporator was charged with 100 gm. of the following solution:

Percent
Technical DDVP _____ 7.7
Paradioxane _____ 5.0
Isopar L _____ 87.3

These evaporators were put to use in a room of which the temperature was kept at 21±2° and of which the humidity was constant at 50±10.

At the end of 15 days, about 40% of the solution was evaporated; the quantities of DDVP and dioxane not evaporated were measured and the following contents found:

Percent
DDVP _____ 7.6±0.2
Paradioxane _____ 4.9±0.3

It can be seen that the proportions of these constituents, carefully chosen for the preparation of the solution, were practically the same as the initial proportions.

These results are particularly astonishing if one takes into account the fact that the above constituents possess vapor pressures at 20° C. different in a proportion of 1 to 2700 (DDVP 0.01 torr; p-dioxane 27 torr).

On the other hand, a solution of constant contents was obtained using the following formulation:

Percent
DDVP _____ 8.7
5,8,11-trioxapentadecane _____ 5.0
Isopar L [a] _____ 86.3

[a] Mixture of synthetic branched aliphatic hydrocarbons, constituted by a mixture of decanes, undecanes and dodecanes, produced by the French Company Esso Standard of Paris, having about 11 carbon atoms.

in which the 5,8,11-trioxapentadecane has a vapor pressure of 0.01 torr at 20° C.

This experiment shows that the proportions of a composition according to the invention, chosen intentionally, are maintained during use of the evaporator apparatus, and this is so, even when using co-solvents of which the vapor pressures are very separate from one another.

EXAMPLES 1-10.—COMPOSITIONS USING AROMATIC HYDROCARBONS AS CO-SOLVENTS

| | Example | | | | | | | | | |
|---|---|---|---|---|---|---|---|---|---|---|
| DDVP | 3.6 | 7.5 | 3.9 | 3.5 | 7.7 | 4.0 | 3.5 | 3.8 | 7.7 | 7. |
| Principal solvent: | | | | | | | | | | |
| "Isopar L" [a] | 66.4 | 52.5 | 66.1 | | | 65.4 | | | | 51. |
| "Soltrol 160" [b] | | | | 66.5 | | | | | 51.1 | |
| n-Dodecane | | | | | 52.3 | | 51.3 | 65.6 | | |
| Co-solvent: | | | | | | | | | | |
| Tetraline | | | | 30 | | | 30 | | | |
| 1,4-diisopropyl benzene | 30 | 40 | | 30 | 40 | 30 | 6 | 30 | 40 | 30 |
| Additive material: | | | | | | | | | | |
| Rose-wood essence | | | | | | 0.6 | | 0.5 | 1 | |
| Limonene | | | | | | | 1 | | | 0.8 |

[a] Mixture of synthetic branched aliphatic hydrocarbons, constituted by a mixture of decanes, undecanes and dodecanes, produced by the French company, Esso Standard of Paris, having about 11 carbon atoms.
[b] Mixture similar to Isopar L manufactured by the U.S. company, Philips Petroleum Co. of Bartlesville, Okla.

This experiment, on the other hand, allows the demonstration of the fact that, following the amount of acidity formed in these evaporators put to use in a medium of average humidity, the hydrolysis of DDVP present does not exceed the stoichiometric quantity with respect to the water present in the wick and the solvents used. This confirms the results of experiment A-3, that the co-solvent can be chosen from very hydrophilic compounds, as is the case for paradioxane, without however diminishing the hydrophobic nature of the solution according to the invention.

These experiments show that the hydrophobic liquid compositions of the invention, used in insecticidal evaporation apparatus, have the notable advantage of diffusing relatively constant quantities of phosphoric ester, and also have an equal and permanent efficacy for the whole period of use of the composition.

Since the evaporation only ceases when the whole of the phosphoric ester is used up, an important economy to the user results. On the other hand, it is possible to have the evaporation rates relatively easily adjustable, it being a question of, in the apparatus, the dimensions of the evaporating surface, or the material feeding the same, or again of the internal pressure in this apparatus as well as the temperature of the air.

In addition to the examples specified by the preceding experiments, there will now be described non-limitative examples of certain varieties of insecticidal composition according to the invention. In these examples O-(2,2-dichlorovinyl) O,O-dimethyl phosphate or DDVP, was chosen as the active insecticidal material (all values given are expressed as weight percent of the composition).

EXAMPLES 11-18.—COMPOSITIONS USING HALOGENATED HYDROCARBONS AS CO-SOLVENTS

| | EXAMPLE | | | | | | | |
|---|---|---|---|---|---|---|---|---|
| | 11 | 12 | 13 | 14 | 15 | 16 | 17+ | 18 |
| DDVP | 8.9 | 9.3 | 9.0 | 9.4 | 9.0 | 9.1 | 8.8 | 8.8 |
| Principal solvent: | | | | | | | | |
| "Isopar L"[a] | 86.1 | 85.7 | | | 85.3 | 85.2 | | |
| n-Dodecane | | | 86.0 | 85.6 | | | 85.4 | 85.3 |
| Co-solvent: | | | | | | | | |
| 1-chloro decane | 5 | | 5 | | | | | |
| 1-chloro dodecane | | 5 | | 5 | 5 | 5 | 5 | 5 |
| Additive materials: | | | | | | | | |
| Menthone | | | | | | 0.7 | 0.5 | |
| Menthyl acetate | | | | | | | 0.2 | |
| Citronellol | | | | | | | 0.8 | 0.8 |

[a] Mixture of synthetic branched aliphatic hydrocarbons consituted by a mixture of decanes undecanes and dodecanes produced by the French company Esso Standard of Paris, having about 11 carbon atoms.

EXAMPLES 19-26.—COMPOSITIONS USING KETO COMPOUNDS AS CO-SOLVENTS

| | EXAMPLE | | | | | | | |
|---|---|---|---|---|---|---|---|---|
| | 19 | 20 | 21 | 22 | 23 | 24 | 25 | 26 |
| DDVP | 4.5 | 4.7 | 5.0 | 4.8 | 5.0 | 5.8 | 4.9 | 5.3 |
| Principal solvent: | | | | | | | | |
| "Isopar L"[a] | 75.5 | | 89.0 | 74.0 | 88.5 | 89.0 | | |
| "Soltrol 160"[b] | | 75.3 | | | | | 73.9 | 89.0 |
| Co-solvent: | | | | | | | | |
| Isophorone | 20 | 20 | | 20 | | | 20 | |
| 2-octanone | | | 6 | | 6 | 5 | | 5 |
| Additive materials: | | | | | | | | |
| Linalol | | | | | | 0.4 | | 0.4 |
| Linalyl acetate | | | | | 0.5 | 0.2 | | 0.2 |
| Terpineol | | | | 1 | | | 1 | |
| Octylepoxystearate [c] | | | | 0.2 | | 0.1 | 0.2 | 0.1 |

[a] Mixture of synthetic branched aliphatic hydrocarbons constituted by a mixture of decanes undecanes and dodecanes produced by the French company, Esso Standard of Paris, having about 11 carbon atoms.
[b] Mixture similar to Isopar L manufactured by the U.S. company, Philips Petroleum Co. of Bartlesville Okla.
[c] Product sold under the trademark "Oxy-Es" by the French company, Melle-Bezons.

EXAMPLES 27-52.—COMPOSITIONS USING ALCOHOLIC COMPOUNDS AS CO-SOLVENTS

| Example | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|---|---|---|---|---|---|---|---|
| DDVP | 7 | 7 | 7 | 7.5 | 9 | 7.5 | 7.5 | 8 | 7.5 | 8 | 7 | 8 | 7.5 | 7.5 | 7.5 | 7.5 | 7.0 | 8.5 | 7.5 | 7.5 | 7.5 | 7.5 | 7.2 | 7.2 | 8.4 | 7.3 |
| Principal solvent: | | | | | | | | | | | | | | | | | | | | | | | | | | |
| "Isopar L"[a] | 87.0 | 87.0 | 86.5 | 88.0 | 81.0 | 87.0 | 87.0 | 86.0 | 86.6 | 87.0 | 89.0 | 86.7 | 87.0 | 86.8 | 87.5 | 87.5 | 87.0 | | 87.0 | 87.0 | 86.4 | 87.5 | | 86.6 | 86.1 | |
| "Soltrol 130"[b] | | | | | | | | | | | | | | | | | 87.0 | 87.0 | | | | | 85.6 | 88.3 | | 86.5 |
| n-Dodecane | | | | | | | | | | | | | | | | | | | | | | | | | | |
| Co-solvent: | | | | | | | | | | | | | | | | | | | | | | | | | | |
| 1-heptanol | 6 | | | | | | | | | | | | | | | | | | | | | | | | | |
| 1-octanol | | 6 | | | 10 | | | 6 | | | | | 5 | 5 | | | 3 | | 5 | 2.5 | | 4.5 | 6 | | | 5.5 |
| 2-octanol | | | 6 | 4.5 | | 5.5 | 5.5 | | 5.5 | 5 | 4 | 5 | | 5.5 | 2.5 | 2.5 | 3 | 5 | | 2.5 | 5.5 | | | 4 | | |
| 2-ethyl-1-hexanol | | | | | | | | | | | | | | | 2.5 | 2.5 | | | 5 | 2.5 | | | | | | |
| 3,7-dimethyl-1-octanol | | | | | | | | | | | | | | | | | | | | | | | | | 5 | |
| Additive materials: | | | | | | | | | | | | | | | | | | | | | | | | | | |
| Linalol | | | 0.4 | | | | | | | | | 0.2 | | | | | | | | | 0.5 | | | | | 0.3 |
| Linalyl acetate | | | 0.1 | | | | | | | | | 0.1 | 0.5 | 0.2 | | | | | | | 0.1 | | 0.4 | | | 0.1 |
| Menthone | | | | | | | | | | | | | | | | | | | | | | 0.5 | 0.2 | | 0.5 | |
| Menthyl acetate | | | 0.1 | | | | | | | | | | | | | | | | | | | | | 0.5 | | |
| Phenoxyethanol | | | | | | | | | | | | | | | | | | | | | | | | | | |
| Thymol | | | | | | | | | | | | | | 0.2 | | | | | | | | | | | | |
| 2,4,6-trichlorophenol | 0.5 | | | | | | | | | | | | 0.5 | | | | | | | | | | | 0.6 | | |
| Epoxidised soya bean oil | | | | | | | | | 0.5 | | | | | | | | | | 0.5 | 0.5 | 0.1 | | 0.2 | | 0.5 | 0.3 |

[a] Mixture of synthetic branched aliphatic hydrocarbons, constituted by a mixture of decanes, undecanes and dodecanes, produced by the French company, Esso Standard of Paris, having about 11 carbon atoms.
[b] Mixture similar to Isopar L manufactured by the U.S. company, Phillips Petroleum Co. of Bartlesville, Okla.
[c] Product sold under the Trade Mark "Abrac A" by the British company, Boake, Roberts & Co. of London.

EXAMPLES 53 TO 61.—COMPOSITIONS USING ORGANIC ESTERS AS CO-SOLVENTS

| | Example | | | | | | | | |
|---|---|---|---|---|---|---|---|---|---|
| | 53 | 54 | 55 | 56 | 57 | 58 | 59 | 60 | 61 |
| DDVP | 6.8 | 6.8 | 6.2 | 6.3 | 5.5 | 5.6 | 6.0 | 5.5 | 6.6 |
| Principal solvent: | | | | | | | | | |
| "Isopar L" [a] | 89.2 | | 89.8 | | 89.5 | | 87.5 | 88.9 | |
| n-Dodecane | | 89.2 | | 89.7 | | 89.4 | | | 89.3 |
| Co-solvent: | | | | | | | | | |
| Methyl laurate | 4 | 4 | | | | | | | 2 |
| Methyl caprate | | | 4 | 4 | | | | | 2 |
| 2,4-dimethyl-6-metadioxanyl acetate | | | | | 5 | 5 | 5 | 5 | |
| Additive materials: | | | | | | | | | |
| Spearmint oil | | | | | | | 1 | | |
| Epoxidised soya oil | | | | | | | 0.5 | 0.5 | |

[a] Mixture of synthetic branched aliphatic hydrocarbons, constituted by a mixture of decanes, undecanes and dodecanes, produced by the French company, Esso Standard of Paris, having about 11 carbon atoms.

EXAMPLES 62 TO 71.—COMPOSITIONS CONTAINING DIETHERS AS CO-SOLVENTS

| | Example | | | | | | | | | |
|---|---|---|---|---|---|---|---|---|---|---|
| | 62 | 63 | 64 | 65 | 66 | 67 | 68 | 69 | 70 | 71 |
| DDVP | 7 | 6 | 6.4 | 7.1 | 6.2 | 6.5 | 7.2 | 7 | 7.2 | 7 |
| Principal solvent: | | | | | | | | | | |
| "Isopar L" [a] | 89.5 | 88.0 | 88.6 | | | | | 88.5 | 87.5 | 87.9 |
| "Soltrol 160" [b] | | | | | | | 89.5 | | | |
| n-Dodecane | | | | 89.4 | 87.8 | 88.5 | | | | |
| Co-solvent: | | | | | | | | | | |
| 5,9-dioxa-dodecane | 3.5 | | | 3.5 | | | 4 | 3.5 | 3.5 | |
| 3,6-dioxa-octane | | 6 | | | 6 | | | | | |
| 3,6-dioxa-decane | | | 5 | | | 5 | | | | 4.5 |
| Additive materials: | | | | | | | | | | |
| Limonene | | | | | | | | 1 | | |
| Lavender essence | | | | | | | | | 0.8 | |
| Epoxidised soya oil [c] | | | | | | | | | | 0.5 |

[a] Mixture of synthetic branched aliphatic hydrocarbons, constituted by a mixture of decanes, undecanes and dodecanes, produced by the French company, Esso Standard of Paris, having about 11 carbon atoms.
[b] Mixture similar to Isopar L manufactured by the U.S. company, Philips Petroleum Co. of Bartlesville, Okla.
[c] Product sold under the trademark "Abrac A" by the British company, Boake, Roberts and Co. of London.

EXAMPLES 72 to 84.—COMPOSITIONS CONTAINING TRIESTERS AS CO-SOLVENTS

| | Example | | | | | | | | | | | | |
|---|---|---|---|---|---|---|---|---|---|---|---|---|---|
| | 72 | 73 | 74 | 75 | 76 | 77 | 78 | 79 | 80 | 81 | 82 | 83 | 84 |
| DDVP | 7.5 | 9.2 | 10.6 | 9.7 | 9.5 | 9.2 | 9.7 | 9.7 | 9.7 | 9.2 | 8.7 | 7.2 | 8.4 |
| Principal solvent: | | | | | | | | | | | | | |
| "Isopar L" [a] | 86.5 | 85.8 | 84.4 | | | 84.8 | 84.9 | 84.7 | 84.8 | 85.26 | 86.3 | 89.3 | 86.06 |
| "Soltrol 160" [b] | | | | 85.3 | | | | | | | | | |
| N-Dodecane | | | | | 85.5 | | | | | | | | |
| Co-solvent: | | | | | | | | | | | | | |
| 2,5,8-trioxanonane | 6 | | | | | | | | | | | | |
| 3,6,9-trioxaundecane | | 5 | 5 | 5 | 5 | 5 | 5 | 5 | 5 | 5 | | | |
| 5,8,11-trioxapentadecane | | | | | | | | | | | 5 | 3.5 | 5 |
| Additive materials: | | | | | | | | | | | | | |
| Limonene | | | | | | 1 | | | | | | | |
| Linalyl acetate | | | | | | | 0.4 | | | | | | |
| Menthyl acetate | | | | | | | | 0.2 | | | | | |
| Menthone | | | | | | | | | 0.4 | | | | |
| Thymol | | | | | | | | | | 0.5 | | | |
| Epoxidised soya oil [c] | | | | | | | | | | | 0.5 | | 0.5 |

[a] Mixture of synthetic branched aliphatic hydrocarbons, consittuted by a mixture of decanes, undecanes and dodecanes, produced by the French company, Esso Standard of Paris, having about 11 carbon atoms.
[b] Mixture similar to Isopar L manfactured by the U.S. company, Philips Petroleum Co. of Bartlesville, Okla.
[c] Product sold under the trademark "Abrac A" by the British company, Boake, Roberts & Co. of London.

EXAMPLE 85 TO 94.—COMPOSITIONS CONTAINING TETRAETHERS OR PENTAETHERS AS CO-SOLVENTS

| | Example | | | | | | | | | |
|---|---|---|---|---|---|---|---|---|---|---|
| | 85 | 86 | 87 | 88 | 89 | 90 | 91 | 92 | 93 | 94 |
| DDVP | 7 | 7 | 7.2 | 7 | 7 | 7 | 7 | 7.6 | 7.6 | 7.7 |
| Principal solvent: | | | | | | | | | | |
| "Isopar L" [a] | 88.0 | | | 87.0 | 87.3 | 87.4 | 87.4 | 88.4 | 87.6 | |
| "Soltrol 160" [b] | | 88.0 | | | | | | | | |
| n-Dodecane | | | 87.8 | | | | | | | 87.5 |
| Co-solvent: | | | | | | | | | | |
| 2,5,8,11-tetraoxa dodecane | 5 | 5 | 5 | 5 | 5 | 5 | 5 | | | |
| 2,5,8,11,14-pentaoxa pentadecane | | | | | | | | 4 | 4 | 4 |
| Additive materials: | | | | | | | | | | |
| Limonene | | | | 1 | | | | | | |
| Linalyl acetate | | | | | 0.7 | | | | | |
| Menthyl acetate | | | | | | 0.2 | | | | |
| Menthone | | | | | | | 0.4 | | | |
| Octyl epoxystearate [c] | | | | | | | | 0.6 | 0.8 | 0.8 |

[a] Mixture of synthetic branched aliphatic hydrocarbons, constituted by a mixture of decanes, undecanes and dodecanes, produced by the French company, Esso Standard of Paris, having about 11 carbon atoms.
[b] Mixture similar to Isopar L manufactured by the U.S. company, Philips Petroleum Co. of Bartlesville, Okla.
[c] Product sold under the trademark "Oxy-es" by the French company, Melle-Bezons.

It is evident that the invention is not limited to the formulations just disclosed, which are all given as illustrative of the manifold possibilities of applications of the invention.

Furthermore the present invention concerns, as new industrial products, stabilised insecticidal compositions comprising a phosphoric ester in the presence of an alcoholic compound of which at least one hydroxy alcoholic function is free. Such compositions have the property of a particularly high stability to aging, which permits a longer storage and in consequence, in use, either an increase in their duration of use or an increase in their efficacy during a given period.

The use of alcohols, in insecticidal compositions based on phosphoric esters, as solvents or diluents for the esters is well known. It has been proposed, for example to use alcohols having at least 10 carbon atoms in solid compositions based on O-(2,2-dichlorovinyl)-O,O-dimethyl phosphate, or DDVP, from which the volatile and insecticidal phosphoric ester can evaporate into the atmosphere.

Moreover the solvent properties of alcohols have been used by the applicants to reinforce the solvent power of hydrocarbons in liquid insecticidal compositions based on phosphoric esters, and can be progressively evaporated into the atmosphere from a so-called "wick" evaporator.

The present invention is based on two discoveries of surprising character. The first discovery, which does not result from the known state of the art is that certain phosphoric esters are sensitive to the action of organic compounds carrying at least one free group of the nature of an alcoholic hydroxy group. This results in partial decomposition of the esters, more or less rapid in time, and in consequence a reduction in the efficiency of compositions in which these esters and these alcoholic compositions are present.

The reactivity of these alcoholic compounds has been shown by the experiments hereinafter set forth.

EXPERIMENT A

A solution of the following composition is prepared:

|  | G. |
|---|---|
| DDVP (technical grade) | 7.5 |
| Secondary octanol | 1 |
| Inert solvent | 91.5 |

In this experiment and those which follow, the inert solvent is constituted by a mixture of saturated aliphatic hydrocarbons containing an average of 11 carbon atoms and having a density of 0.767 at 15° C.

The moisture content of the solvent mixture (octanol plus inert solvent) was about 1 millimole: after forming the solution its content of DDVP was 33.8 millimoles and that of octanol was 7.7 millimols.

This solution was kept at 55° C. for 30 days in a hermetically sealed vessel: at the end of this time the content of DDVP was measured by gaeous phase chromatography (aerograph apparatus type 90 P4; five-foot column of ¼ inch diameter, of silicone XE60 on Sil-O-Cel C22 of 250/500 microns, temperature 190° C., detection by catharometer): content of DDVP found, was 29.5 millimols, which indicates a destruction of 33.8—29.5=4.3 millimols.

The content of octanol, at the end of the same period was measured by gaseous phase chromatography (aerograph apparatus type 204:five-foot column ⅛ inch diameter of "Carbowax" 4000 on Sil-O-Cel C22 of 250/500 microns: temperature 145° C.: detection by ionisation of flame): the octanol content was found to be 4.2 millimols, which indicates a distinction of 7.7—4.2=3.5 millimols.

The sum of this first experiment can be expressed as follows:

|  | Millimols |
|---|---|
| DDVP destroyed | 4.3 |
| Destruction due to moisture | 1.0 |
| Difference | 3.3 |
| Octanol destroyed | 3.5 |

These results show that the quantity of octanol destroyed corresponds to that of the DDVP which has disappeared, taking into account the known hydrolysing effect of the moisture: the presence of the octanol therefore promotes the decomposition of the phosphoric ester.

EXPERIMENT B

A solution of the following composition was prepared:

|  | G. |
|---|---|
| DDVP (technical grade) | 7 |
| Primary octanol | 5 |
| Inert solvent | 88 |

The moisture content of the solvent mixture (octanol plus inert solvent) was about 1.5 millimols: after forming the solution its content of DDVP was 30.4 millimols and its content of octanol was 38.4 millimols.

This solution was maintained at 20±2° C. for 200 days in a hermetically sealed vessel: at the end of this period the content of DDVP and of octanol was measured by gas chromatography as described in Experiment A: the content of DDVP was found to be 21.2 millimols, which indicates a destruction of 30.4—21.2=9.2 millimols: the content of octanol was found to be 30.6 millimols; which indicates a destruction of 38.4—30.6=7.8 millimols.

The sum of this second experiment can be expressed as follows:

|  | Millimols |
|---|---|
| DDVP destroyed | 9.2 |
| Destruction due to moisture | 1.5 |
| Difference | 7.7 |
| Octanol destroyed | 7.8 |

These results show that the reaction between a phosphoric ester such as DDVP and an alcohol, in light at 55° C. in Experiment A, takes place also at ambient temperature.

Other experiments have enabled the applicants to establish that the degradation products of DDVP and primary octanol are respectively O-(2,2-dichlorovinyl)-O-methyl hydrogen phosphate and 1-methoxy-octane. The following reaction scheme may be written:

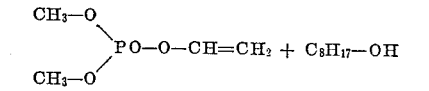

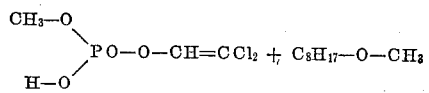

or more generally

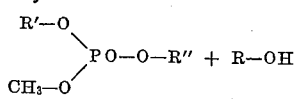

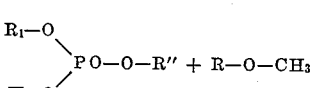

EXPERIMENT C

Solutions in various alcohols containing 50% by weight of DDVP were prepared: each solution was divided into several parts each placed in a separate phial:

All the phials are placed in a water-bath of which the temperature was maintained at 95/100° C.: every two hours a phial of each solution was removed and a potentiometric estimation of the acidity was made, from which the extent of destruction of the DDVP could be established: the following table gives the amounts destroyed at 2, 4, 8, 12 and 20 hours on four of the solutions tested.

| Alcohol tested percent | Duration of heating (in hours) | | | | |
| --- | --- | --- | --- | --- | --- |
|  | 2 | 4 | 8 | 12 | 20 |
| Secondary octanol | 9.7 | 16.8 | 17.6 | 38.5 | 55.5 |
| Primary octanol | 3.4 | 32.0 | 47.0 | 58.5 | 71.5 |
| Normal dodecanol | 16.8 | 19.0 | 33.0 | 46.0 | 61.5 |
| Linalol | 8.0 | 10.3 | 19.9 | 30.0 | 50.0 |

These results show that the destruction of phosphoric ester is effected as well by tertiary alcohols as by secondary alcohols and primary alcohols, the rate of destruction being greatest for the primary alcohols and least for the tertiary alcohols.

The second discovery is the basis of the present invention and consists in that the foregoing phenomenon of reactivity can be inhibited by the addition to the insecticidal composition of one or more compounds which will be now defined.

According to the present invention a stabilised insecticidal composition comprising a phosphoric ester which contains at least one alkyl group having 1 to 3 carbon atoms and at least one organic compound carrying at least one alcoholic hydroxyl group, is characterised in that it contains, as stabilising agent for the phosphoric ester at least one epoxide compound.

In the foregoing experiments it has been shown that the DDVP comprising two methyl groups is sensitive to the action of all the alcohols.

It has also been shown, when one repeats these experiments changing the nature of the phosphoric ester that the affinity of the ester towards the alcohols decreases as the number of carbon atoms of the alkyl groups increases and that it becomes nil above 3 carbon atoms.

As epoxide compound there is to be understood all compounds containing an epoxy group and preferably falling within the following classes, given by way of non-limitative examples:

the alkyloxitanes such as those known as propylene oxide, butylene oxide, epichlorohydrin, 2,3-epoxypropanol, phenoxymethyl oxitane
the aryloxitanes such as styrene oxides
the epoxy cyclanes such as cyclohexane oxide and 9,10-epoxycyclododecadiene-1,5
the epoxidised acid esters such as the alkyl and cycloalkyl epoxy tallates and epoxy stearates
the glycerides containing an epoxidised acyl residue such as epoxidised oils
the glyceric esters such as ethyl phenylglycidate The preferred epoxidised compounds are the alkyl and cycloalkyl 9,10-epoxy stearates and the glycerides containing epoxy stearic acids such as the epoxidised oils of soya, poppy, sunflower, flax and china-wood.

The quantity of epoxy compounds used separately or in admixture is generally between 0.1 and 20% by weight of the insecticidal composition and preferably between 0.2 and 10%.

This quantity depends on a certain number of parameters among which are in the first place the moisture content and acidity of the composition. It is known indeed that acids destroy the epoxy compounds and that the acidity of the composition can increase with time under the effect the hydrolysis of the phosphoric esters consequent on the humidity.

Preferably, to take account of the two foregoing parameters, one utilises a quantity of epoxy compound at least stoichiometrically equivalent to compensate the sum of the acidity present in the composition and the potential acidity which can arise by hydrolysis of the phosphoric ester.

The quantity of epoxy compound added to the composition depends also on the molecular weight of the epoxy compounds themselves, the sensitivity of the phosphoric esters to the alcoholic compounds and to the degree of reactivity of these latter. To take account of these last parameters one advantageously increases the quantity of stabilisers determined for the compensation of the acidity by an addition of the same epoxy compounds. This addition will be greater with a phosphoric ester containing a methyl group than with the same weight of a phosphoric ester containing an ethyl group. Further, an alcoholic compound having a primary hydroxy group needs a weight equal to a stronger addition of stabiliser than that necessary with an alcoholic compound having a hydroxyl group which is secondary, or with greater reason, tertiary.

The quantity of epoxy compound added to the composition thus depends on the respective quantities of the phosphoric esters and alcoholic compositions which are included in the composition.

These two latter groups of products which are contained in the stabilised composition of the invention will now be described.

By phosphonic ester is to be understood all the esters of all the acids and thioacids of pentavalent, as well as trivalent, phosphorus, these esters comprising at least one alkyl group having 1 to 3 carbon atoms. Thus, for example, in relation to the esters of phosphoric acid the expression "phosphoric ester" includes also those of pyrophosphonic acid, thiophosphonic acid, dithiophosphonic acid, phosphorous acid and phosphoric and phosphonic acids.

More particularly, the alkyl groups which are methyl, ethyl, n-propyl or isopropyl radicals are attached to the phosphoric acids by esterification of their acid functions. Generally, there are one or two of these groups and in the latter case they can be the same or different.

By the alcoholic compound is to be understood all organic compounds containing at least one alcoholic hydroxyl group. By way of non-limitative examples there can be cited the following chemical groups:

saturated or unsaturated primary, secondary or tertiary aliphatic alcohols
saturated or unsaturated alicyclic alcohols
aralkanols and aralkenols
glycols and their monoesters and monoethers
partially esterified and/or esterified polyols The alcoholic compounds are chosen with regard to the value intended for them in the insecticidal composition. Indeed, they may be incorporated (1) as principal solvents or diluents of the phosphoric ester or esters used
(2) as supplementary reinforcing solvents to non-hydroxyl solvents or diluents for the phosphoric ester or esters
(3) as odorant products, such natural or synthetic odorants as geraniol, linalol, terpineol methol and citromellol, or compositions containing one or more of these odorant materials
(4) supplementary active materials, such as an acaricidal agent (chlorobenzilate, chloropropylate, dicofol, dichlorophenylethanol, etc.) an insect-repellant agent (hydroxyethylthiooctane, ethohexadiol, butylethyl propane diol, etc.), a bird-repellant (for example chlorolose), a fungicidal agent (cycloheximide, hydroxyethylheptadecylglyoxalidine, pentachlorbenzyl alcohol, etc.), a plant growth-regulating agent (for example hydroxyethyl urea) a herbicidal agent (dichlorolurea, allyl alcohol, etc.) or a bactericidal agent (dimethyl dioxanol, chloramphenical, cetophenical, etc.).

Alcoholic compounds may be present fortuitously in insecticidal compositions. It is a matter, for example, of impurities contained in nonhydroxylated solvents or diluents used in the preparation of insecticidal compositions.

It follows from the foregoing that several alcoholic compounds may be found simultaneously in the insecticidal compositions, each one of them playing its own role, voluntarily or otherwise, and that the quantities incorporated are very variable.

The stabilised insecticidal compositions of the invention may be solid, as well as liquid, and may contain or be supported as desired by, inert bodies such as for example, fibres or powders of animal, vegetable or mineral origin.

The properties of stabilised insecticidal compositions according to the invention have been examined in the course of experiments of which three examples will now be given:

EXPERIMENT D

A solution of the following composition was prepared:

| | Percent |
|---|---|
| DDVP | 7.7 |
| Anhydrous secondary octanol | 5.0 |
| Inert solvent | 87.3 |

Further, a solution as above was prepared replacing 0.4% of the inert solvent by epoxidised soya oil. Each of the two solutions was placed in a hermetically sealed flask and maintained at 20±2° C. for 6 months.

At the end of this period the DDVP was estimated in each solution by means of a potentiometric method based on the reactivity of sodium N,N-diethyl dithiocarbamate with DDVP. In the case of the solution without the epoxide compound a destruction of 7 g. of the DDVP used was noted: in the case of the solution containing epoxidised soya oil, no destruction was registered.

EXPERIMENT E

Eight solutions were prepared as defined in the following table.

| | A | B | C | D | E | F | Y | Z |
|---|---|---|---|---|---|---|---|---|
| DDVP | 20.0 | 20.0 | 20.0 | 20.0 | 20.0 | 20.0 | 20.0 | 20.0 |
| Primary octanol, percent | 78.5 | 78.5 | 77.8 | | | | 80.0 | |
| Secondary octanol, percent | | | | 78.5 | 78.5 | 77.0 | | 80.0 |
| Epoxidised soya oil, percent [a] | | 3.0 | | | 3.0 | | | |
| Epichlorhydrin, percent | 1.5 | | 1.5 | 1.5 | | 1.5 | | |
| Phenyloxirane, percent [b] | | 1.5 | | | 1.5 | | | |

[a] Product commercialised under the mark Abrac A by the firm Boake Roberts & Co. of London and having a titre of 6 to 6.5% epoxy oxygen.
[b] Compound commercialised under the name styrene oxide by the United States company, Union Carbide Chemical Co. of New York.

These solutions were each placed in a hermetically sealed flask maintained at 20±2° C. for 60 days. At the end of this period, the quantities of DDVP destroyed in each of the solutions was determined by analysis: the results are summarised in the following tables.

(1) Solutions based on primary octanol:

| | Percent |
|---|---|
| A | 8.1 |
| B | 8.4 |
| C | 7.4 |
| Y | 12 |

(2) Solutions based on secondary octanol:

| | Percent |
|---|---|
| D | 2.4 |
| E | 3.7 |
| F | 1 |
| Z | 6.4 |

These experiments show that for the 4 solutions A, B, C and Y containing primary octanol, the destruction of DDVP present in the stabilised solutions A, B and C is less great than that observed for DDVP present in the unstabilised test solution Y.

Similarly they show that for the 4 solutions D, E, F and Z containing secondary octanol, where the destruction of the DDVP is less, a difference of destruction of the phosphonic ester much less great in the three stabilised solutions D, E and F than in the unstabilised test solution Z.

EXPERIMENT F

Eight solutions were prepared as defined in the following table:

| | G | H | J | K | L | M | N | X |
|---|---|---|---|---|---|---|---|---|
| DDVP, percent | 7.5 | 7.5 | 7.5 | 7.5 | 7.5 | 7.5 | 7.5 | 7.5 |
| Secondary octanol, percent | 3.0 | 3.0 | 3.0 | 3.0 | 3.0 | 3.0 | 3.0 | 3.0 |
| Inert solvent, percent | 89.1 | 89.0 | 88.5 | 88.5 | 88.5 | 88.5 | 89.5 | 89.5 |
| Epichlorhydrin, percent | 0.4 | | | | | | | |
| Phenyloxirane, percent [b] | | 0.5 | | | | | | |
| Epoxidised soya oil, percent [a] | | | 1.0 | | | | | |
| Epoxidised soya oil, percent [c] | | | | 1.0 | | | | |
| 9,10-epoxy-alkyl stearate, percent [d] | | | | | 1.0 | | | |
| 9,10-epoxy-cyclo-alkyl stearate, percent [e] | | | | | | 1.0 | | |
| 9,10-epoxy-octyl stearate, percent [f] | | | | | | | 1.0 | |

[a] [b] same as above Experiment E.
[c] Product commercialised under the mark "Tavoxy 64" by the company, Solvay & Cie, having a titre of about 6.2% epoxy oxygen.
[d] Product commercialised under the mark "Epoxy D-72" by the German company, Henkel International G.m.b.H., of Dusseldorf and having a titre of 4.5 to 5% epoxy oxygen.
[e] Product commercialised under the mark Epoxy HS 235 by the German Company, Henkel above, and having a titre of 4.5 to 5% epoxy oxygen.
[f] Product commercialised under the mark Oxy-Es by the French company, Melle-Bezons.

These solutions were each placed in a hermetically sealed flask maintained at 40° C. for 150 days. At the end of this period, the quantities of DDVP destroyed in each of the solutions was determined by analysis: the results are summarised in the following table:

| | Percent |
|---|---|
| G | 41.3 |
| H | 25.3 |
| J | 20.0 |
| K | 6.6 |
| L | 18.0 |
| M | 16.0 |
| N | 21.3 |
| X | 81.3 |

It is to be noted here also in this last experiment that the destruction of DDVP contained in the unstabilised test solution X is incomparably greater than in the other stabilised solutions, all these solutions containing a solvent mixture constituted by secondary octanol and the same inert solvent.

The three experiments D, E, F effected following different operative conditions show the epoxide compounds prevent, retard, or delay, the decomposition of preparations containing a phosphonic ester and an alcohol. As can be observed the best results have been obtained in Experiment D where the alcohol is a co-solvent.

Non-limiting examples of certain forms of stabilised insecticidal compositions will now be described.

Example 1

Stabilised insecticidal compositions in concentrated form useful for this production of insecticidal formulations and comprising DDVP as phosphonic ester, an alcoholic compound, carrying an alcoholic hydroxyl group, as solvent, and an epoxy compound as stabiliser.

| | | | | | | | | | | | |
|---|---|---|---|---|---|---|---|---|---|---|---|
| DDVP, percent | 50 | 58 | 54 | 54 | 54 | 70 | 62 | 60 | 65 | 54 | 58 |
| 2-ethyl-butanol, percent | | | | | | | 32 | | | | |
| 2-ethoxy-ethanol, percent | | | | | | | | 34 | | | |
| 2-butoxy-ethanol, percent | | | | | | | | | 30 | | |
| n. Heptanol, percent | | | 43 | | | | | | | | |
| 2-ethyl-hexanol, percent | | | | | | | | | | 40 | |
| n. Octanol, percent | 36 | 40 | | | | | | | | | |
| Sec. octanol, percent | | | | 42 | 42 | 27 | | | | | |
| n. Dodecanol, percent | | | | | | | | | | | 35 |
| Epoxidised soya oil, percent [a] | 7 | | 6 | 4 | | 3 | | 6 | | 6 | |
| Alkyl epoxystearate, percent [b] | | 6 | | | | | | 6 | | | 7 |
| Cycloalkyl epoxystearate, percent [c] | | | | | 4 | | | | 5 | | |

[a] Same as above, Experiment E.
[b] Product commercialised under the mark "Epoxy D-72" by the German company, Henkel International G.m.b.H, of Dusseldorf and having a titre of 4.5 to 5% epoxy oxygen.
[c] Product commercialised under the mark Epoxy HS 235 by the German company, Henkel above, and having a titre of 4.5 to 5% epoxy oxygen.

Example 2

Stabilised insecticidal compositions, in concentrated form, useful for the production of insecticidal and acaricidal formulations, and comprising DDVP as phosphonic ester, acetone as solvent, an acaricide (chlorobenzilate, chloropropylate) and an epoxy compound as stabiliser.

| | | | | | | | | |
|---|---|---|---|---|---|---|---|---|
| DDVP, percent | 20 | 20 | 20 | 18 | 18 | 16 | 16 | 16 |
| Chlorobenzilate, percent [g] | 10 | | | | | | | |
| Chloropropylate, percent [h] | | 10 | 10 | 12 | 12 | 6 | 6 | 8 |
| Epoxidised soya oil, percent [a] | 3 | 3 | | 4 | | 2 | | |
| Octyl epoxystearate, percent [f] | | | 3 | | | | | 3 |
| Alkyl epoxystearate, percent [d] | | | | | 4 | | | |
| Cycloalkyl-epoxystearate, percent [e] | | | | | | | 3 | |
| Acetone, percent | 67 | 67 | 67 | 66 | 66 | 76 | 75 | 73 |

[a] Same as above, Experiment E.
[d] Product commercialised under the mark "Epoxy D-72" by the German company, Henkel International G.m.b.H, of Dusseldorf and having a titre of 4.5 to 5% epoxy oxygen.
[e] Product commercialised under the mark Epoxy HS 235 by the German company, Henkel above, and having a titre of 4.5 to 5% epoxy oxygen.
[f] Product commercialised under the mark Oxy-Es by the French company, Melle-Bezons.
[g] Common name for ethyl 4,4'-dichlorobenzilate, manufactured and sold by the applicants.
[h] Common name for isopropyl 4,4'-dichlorobenzilate, manufactured and sold by the applicants.

Example 3

Stabilised insecticidal compositions, in concentrated form, useful for the production of odorant insecticide formulations and comprising DDVP as phosphonic ester, a terpene alcohol (linalol, terpineol, citronellol, menthol, 1-octene-3-ol) and/or an essential oil (essence of rosewood, essence of curly mint, essence of palmarosa, essence of lavender), an epoxy compound as stabiliser.

It is to be understood that the invention is not restricted to the modes of execution which have been described in the preceding examples, which have been given especially as illustrative of the many possibilities of application of the invention.

What is claimed is:

1. Volatile and hydrophobic liquid composition, usable in an evaporator for diffusing vapors of active insecticidal substances into the atmosphere and comprising (A) about 3 to 25% of at least one phosphoric acid ester- or thionophosphoric acid ester insecticide defined by the general formula

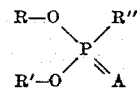

in which,
      A is oxygen or sulfur
      R and R' are the same or different alkyl residues containing 1–3 carbon atoms, and
      R'' is one of the following two groups:

(a) 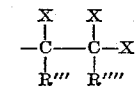

in which R''' and R'''' are the same or different and are each hydrogen, halogen or alkyl, and X is halogen;

(b) 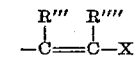

in which R''', R'''' and X have the meanings just assigned;

(B) at least one saturated aliphatic or alicyclic hydrocarbon distilling between about 100° and 320° under atmospheric pressure or having a vapor pressure at 20° C. between 0.001 and 30 torr; and (C) 1 to 40% of at least one organic co-solvent which is soluble in the principal solvent (B) and is capable of dissolving per liter an insecticidally effective amount of component (A), and has a vapor pressure of 20° C. between 0.01 and 30 torr, or distills between 100° and 320° C. at atmospheric pressure, and which is selected from the group consisting of aromatic hydrocarbons, halogenated aliphatic hydrocarbons, halogenated aromatic hydrocarbons, monoethers, diethers, triethers, tetraethers, pentaethers, heterocyclic compounds, acyclic hydroxy compounds, alicyclic hydroxy compounds, aromatic hydroxy compounds, heterocyclic hydroxy compounds, organic monoesters, organic diesters, acyclic ketones, alicyclic ketones, aromatic ketones, amides and nitriles; the balance of the composition consisting essentially of component (B); the amounts of (A), (B) and (C) being so proportioned that they are equal or approximately equal to the proportions of these components which exist in the vapor mixture which evaporates from the composition by way of an evaporator into the surrounding atmosphere, all percentages being based on the total weight of the composition.

| | | | | | | | | | | | |
|---|---|---|---|---|---|---|---|---|---|---|---|
| DDVP, percent | 91 | 93 | 91 | 94 | 92 | 94 | 94 | 92 | 92 | 95 | 92 | 92 |
| Linalol, percent | | | 7 | | | | | | | | 3 | 3 |
| Terpineol, percent | | 5 | | | | | | | | | | |
| Citronellol, percent | | | | 6 | | | | | | | | |
| Menthol, percent | | | | | 4 | | | | | 1 | | |
| 1-octene-3-ol | | | | | | 2 | | 2 | | | | |
| Essence of rosewood, percent | | | | | | 6 | | | 4 | | | |
| Essence of curly mint, percent | | | | | | | 5 | | | 3 | | |
| Essence of Palmarosa, percent | | | | | | | | 5 | | | | |
| Essence of lavender, percent | | | | | | | | | 4 | | 3 | 3 |
| Octyl-epoxystearate, percent [f] | | 2 | | 2 | | | | | | 2 | 2 | |
| Epoxidised soya oil, percent [a] | 2 | | 3 | | 2 | 1 | 1 | 2 | | 1 | | 2 |

[a] Same as above, Experiment E.
[f] Product commercialised under the mark Oxy-Es by the French company, Melle-Bezons.

2. Volatile and hydrophobic liquid composition, usable in an evaporator for diffusing vapors of active insecticidal substances into the atmosphere and comprising (A) about 1 to 60% of at least one phosphoric acid ester- or thionophosphoric acid ester insecticide defined by the general formula

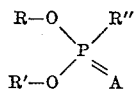

in which

A is oxygen or sulfur

R and R′ are the same or different alkyl residues containing 1–3 carbon atoms, and R″ is one of the following two groups:

(a)

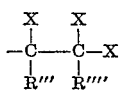

in which R‴ and R⁗ are the same or different and are each hydrogen, halogen or alkyl, and X is halogen;

(b)

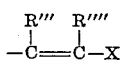

in which R‴, R⁗ and X have the meanings just assigned;

(B) at least one saturated aliphatic or alicyclic hydrocarbon distilling between about 100° and 320° C. under atmospheric pressure or having a vapor pressure at 20° C. between about 0.001 and 30 torr; and (C) about 1 to 20% of at least one organic co-solvent which is soluble in the principal solvent (B) and is capable of dissolving per liter an insecticidally effective amount of component (A) and has a vapor pressure at 20° C. between 0.01 and 30 torr, or distills between 100° and 320° C. at atmospheric pressure, and which is selected from the group consisting of (a) aromatic hydrocarbons, and (b) halogenated branched or straight chain alkanes, and (c) halogenated aromatic hydrocarbons, and (d) monoethers of the formula

in which R‴ is alkyl of 1 to 6 carbons and R⁗ is halogen or alkyl group of 1 to 4 carbons, and (e) diethers of the formula $$R_a—O—X—O—R_a'$$

wherein $R_a$ or $R_a'$ are the same or different and are alkyl of 1 to 6 carbons, X represents a divalent hydrocarbon group containing 1 to 6 carbons in straight or branched chain or is benzene, and (f) triethers of the formula $$R_a''—Y—O—Y'—O—R_a'''$$

wherein $R_a''$ and $R_a'''$ are the same or different and are alkyl of 1 to 5 carbons, Y and Y′ are the same or different and are divalent hydrocarbon groups containing 1 to 3 carbons in straight or branched chain, and (g) triethers of the formula

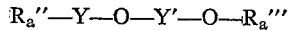

wherein $R_a''$, $R_a'''$ and $R_a''''$ are the same or different and are alkyl of 1 to 5 carbons, Z, represents a trivalent hydrocarbon group containing 1 to 3 carbons in branched or straight chain or is benzene, and (h) tetraethers of the formula $$R_b—O—Y—O—Y'—O—Y''—O—R'_b$$

in which $R_b$ and $R_b'$ are the same or different and an alkyl of 1 to 4 carbons, Y, Y′ and Y″ are the same or different and are divalent hydrocarbon groups of 1 to 3 carbons in straight or branched chain, and (i) pentaethers of the formula $$R_b''—O—Y—O—Y'—O—Y''—O—Y'''—O—R_b'''$$

wherein $R_c''$ and $R_c'''$ are the same or different and are alkyl of 1 to 3 carbons, Y, Y′, Y″ and Y‴ are the same or different and are divalent hydrocarbon groups of 1 to 3 carbons in straight or branched chain, and (j) heterocyclic compounds of the formula

wherein X is O or S and A is the divalent group butadiene-1,3-diyl or 1,4-butanediyl or 3-thia-1,5 pentanediyl or 2-oxa-1,5-pentanediyl or 3-oxa-1,5 pentanediyl, which divalent group is either unsubstituted or substituted by phenyl and/or 1 to 4 alkyl substituents of 1 to 4 carbons, and (k) 2,3-dichloroparadioxane, and (l) aliphatic hydroxy compounds of the formula $$R_c—A'—OH$$

wherein $R_c$ is hydrogen or alkoxy of 1 to 6 carbons and when $R_c$ is other than hydrogen then A′ is a straight or branched chain hydrocarbon of 1 to 3 carbons but when $R_c$ is hydrogen then A′ is a straight or branched hydrocarbon having up to 14 carbons, and (m) cyclohexanol or cyclohexanol substituted by 1 to 4 alkyl groups of 1 to 5 carbons, and (n) aromatic hydroxy compounds of the formula 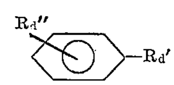 wherein $R_d'$ is hydroxy or hydroxyalkyl of 1 to 5 carbons or hydroxyalkoxy of 1 to 3 carbons, and $R_d''$ is 1 to 3 chlorines and/or one or two alkyl groups of 1 to 4 carbons, and (o) heterocyclic hydroxy compounds of the formula 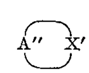 in which X′ is O or S and A″ is the divalent group 1,3-butadiene-1,4-diyl or 1,4-butanediyl or 2-thia-1,5-pentanediyl or 2-oxa-1,5-pentanediyl or 3-oxa-1,5-pentanediyl, which divalent group has a hydroxy or hydroxymethyl substituent and is either unsubstituted or substituted with one to three alkyl groups of 1 to 5 carbons, and (p) monesters of the formula $$R_f—C(=O)—O—R_f'$$

wherein $R_f$ is hydrogen or acetonyl or alkyl of 1 to 13 carbons, $R_f'$ is phenyl, cresyl, alkyl of 1 to 14 carbons, alkenyl of 3 to 11 carbons, cyclohexyl or alkylcyclohexyl in which the or each group has 1 to 4 carbons or $R_f'$ is the residue of a heterocyclic hydroxy compound as defined in (o) above, the total number of carbons in the ester being from 5 to 16, and (q) diesters of the formula

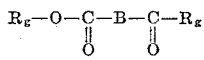

wherein B is a saturated divalent hydrocarbon of 1 to 4 carbons or a direct bond between the two carbonyl groups, and $R_g$ is alkyl of 1 to 4 carbons, and (r) diesters of the formula

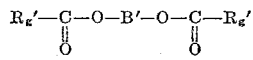

wherein B' is a saturated divalent hydrocarbon of 2 to 6 carbons and $R_g'$ is alkyl of 1 to 3 carbons, and (s) triesters of the formula

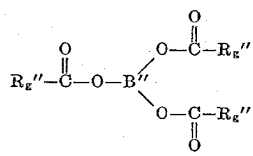

wherein B'' is a trivalent saturated hydrocarbon of 3 to 6 carbons and $R_g''$ is methyl or ethyl, and (t) acyclic ketones of the formula

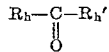

wherein $R_h$ is alkyl of 4 to 8 carbons or acetonyl or acetylethyl, and $R_h'$ is alkyl of 1 to 6 carbons, and (u) alicyclic ketones of the formula

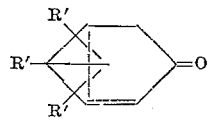

wherein each R' is an alkyl group of 1 to 4 carbons or one or two of them can be hydrogens, the bonds shown in dotted lines being optional and either joint or separate, and (v) aromatic ketones of the formula

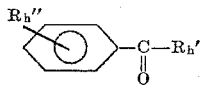

wherein $R_h'$ is alkyl of 1 to 6 carbons and $R_h''$ is hydrogen or one to three alkyls of 1 to 5 carbons or one or two alkoxys of 1 to 3 carbons, and (w) amides of the formula

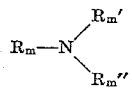

in which $R_m$ is alkanoyl of 1 or 2 carbons, N,N-dimethylcarbamoyl, N,N-diethylcarbamoyl, or N,N,N',N'-tetramethyl phosphorodiamidoyl and $R_m'$ and $R_m''''$ are the same or different and each is an alkyl of 1 to 3 carbons, and (x) nitriles of the formula

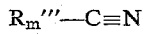

wherein $R_m'''$ is alkyl or chloroalkyl of 2 to 10 carbons or phenyl or tolyl or benzyl or methoxycarbonylmethyl or ethoxycarbonylmethyl or ethoxycarbonylmethyl;

the balance of the composition consisting essentially of (B) and the amounts of (A), (B) and (C) being so proportioned that they are equal or approximately equal to the proportions of these components which exist in the vapor mixture which evaporates from the composition by way of an evaporator into the surrounding atmosphere, all percentages being based on the total weight of the composition.

3. A composition as defined in claim 2, wherein, per 100 g. thereof,
component (A) consists of about 9 g. of O-2,2-dichlorovinyl-O,O-dimethyl phosphate;
component (B) consists of about 85 g. of a mixture of synthetic branched aliphatic hydrocarbon having an average member of 11 carbon atoms; and
component (C) consists of about 5 g. of 3,6,9-trioxo undecane;
and which further contains, per 100 g. thereof, about 0.5 g. of epoxidized soya oil.

4. A composition according to claim 2, wherein the principal solvent has a distillation range between about 140 and 270° C. under atmospheric pressure or a vapor pressure at 20° C. between 0.01 and 5 torr.

5. A composition according to claim 2, wherein the co-solvent is selected from the group of aromatic hydrocarbons of the formula

in which R is hydrogen or alkyl of 1–5 carbon atoms and R' is one to three alkyl groups of 1–4 carbon atoms and located in any positions on the benzene nucleus; R and R' can also represent, taken together, a saturated divalent hydrocarbon residue containing 1–4 carbon atoms.

6. A composition according to claim 2, wherein the co-solvent is selected from the group of halogenated aliphatic hydrocarbon of 6–14 carbon atoms in straight- or branched-chain and one atom of chlorine or bromine, or of 2–8 carbon atoms in branched- or straight-chain and 2–6 chlorine atoms or 2–4 bromine atoms, one to three of these last being replaceable by one to three atoms of chlorine.

7. A composition according to claim 2, wherein the co-solvent is an aromatic halogenated hydrocarbon of the formula

in which R is hydrogen or alkyl of 1–5 carbon atoms and R'' represents one to three substituents selected from chlorine and bromine.

8. A composition according to claim 2, wherein the co-solvent is a monoether of the formula

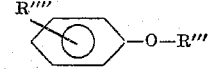

in which R''' is alkyl of 1–6 carbon atoms and R'''' is a middle halogen or alkyl of 1–4 carbon atoms.

9. A composition according to claim 2 wherein the co-solvent is a diether of the formula

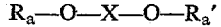

in which $R_a$ and $R_a'$ are the same or different and are alkyl of 1–6 carbon atoms, X is a divalent hydrocarbon group of 1–6 carbon atoms which are in straight or branched chain, or at least part of which carbon atoms form a ring.

10. A composition according to claim 2, wherein the co-solvent is a triether of the formula

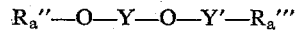

in which $R_a''$ and $R_a'''$ are the same or different and are alkyl of 1–5 carbon atoms, and Y and Y' are the same or different and are divalent hydrocarbon groups containing 1–3 carbon atoms in branched or straight chain.

11. A composition according to claim 2, wherein the co-solvent is a triether of the formula

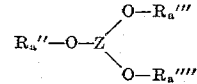

in which R″, R‴, and R″″ are the same or different and are alkyl of 1–5 carbon atoms, Z is a trivalent hydrocarbon group, straight or branched chain, containing 1–3 carbon atoms, or is a benzene nucleus.

12. A composition according to claim 2, wherein the co-solvent is a tetraether of the formula $$R_b-O-Y-O-Y'-O-Y''-O-R_b'$$

in which $R_b$ and $R_b'$ are the same or different and are alkyl of 1–4 carbon atoms, Y, Y' and Y'' are the same or different and divalent hydrocarbon groups, straight or branched chain, containing 1–3 carbon atoms.

13. A composition according to claim 2, wherein the co-solvent is a pentaether of the formula $$R_b''-O-Y-O-Y'-O-Y''-O-Y'''-O-R_b'''$$

in which $R_b''$ and $R_b'''$ are the same or different and are alkyl of 1–3 carbon atoms, Y, Y', Y'' and Y''' are the same or different and are divalent hydrocarbon groups, straight or branched chain, of 1–3 carbon atoms.

14. A composition according to claim 2, wherein the co-solvent is a heterocyclic compound of the formula:

in which X' is oxygen or sulphur and A is a divalent group selected from butadiene-1,3-diyl, 1,4-butane-diyl, 3-thia-1,5-pentanediyl, 2-oxa-1,5-pentane-diyl and 3-oxa-1,5-pentane-diyl, which group can itself carry a substituent phenyl residue and/or four substituent alkyl groups of 1–5 carbon atoms each.

15. A composition according to claim 2, wherein the co-solvent is an acyclic hydroxy compound of the formula $$R_c-A-OH$$

wherein $R_c$ is hydrogen or alkoxy of 1–6 carbon atoms, or alkoxyalkoxy of 2–6 carbon atoms, A is a divalent hydrocarbon group, straight or branched chain, of 2–6 carbon atoms, or up to 14 carbon atoms when $R_c$ is hydrogen.

16. A composition according to claim 2, wherein the co-solvent is an alicyclic hydroxyl compound of the formula

in which $R_d$ is hydrogen or one to four alkyl of 1–5 carbon atoms.

17. A composition according to claim 2, wherein the co-solvent is an aromatic hydroxy compound of the formula

in which $R_d'$ is hydroxy or hydroxyalkyl of 1–5 carbon atoms or hydroxyalkoxy of 1–3 carbon atoms; $R_d''$ is 1–3 atoms of chlorine and/or one or two alkyl groups of 1–4 carbon atoms.

18. A composition according to claim 2, wherein the co-solvent is a heterocyclic hydroxy compound of the formula

in which X' is oxygen or sulphur and A″ is a divalent group selected from 1,3-butadiene-1,4-diyl, 1,4-butanediyl, 2-thia-1,5-pentanediyl, 2-oxa-1,5-pentanediyl and 3-oxa-1,5-pentanediyl, the said group carrying a hydroxy or hydroxymethyl substituent and, optionally, one to three substituent alkyl groups each of 1–5 carbon atoms.

19. A composition according to claim 2, wherein the co-solvent is an organic monoester of the formula

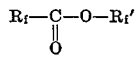

in which $R_f$ is hydrogen, acetonyl or alkyl of 1–13 carbon atoms, $R_f'$ is phenyl or cresyl or alkenyl of 3–11 carbon atoms or cyclohexyl or alkylcyclohexy1 in which every alkyl contains 1–4 carbon atoms, or $R_f'$ is a residue resulting from a heterocyclic hydroxy compound as defined in claim 20, the total number of carbon atoms in the ester being at least 5 and at most 16.

20. A composition according to claim 2, wherein the co-solvent is an organic diester selected from an ester of the formula

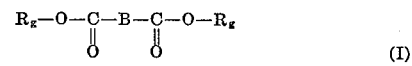

in which formula B is a saturated divalent hydrocarbon group of 1–4 carbon atoms or a direct bond between the two carbonyl groups and $R_g$ is alkyl of 1–4 carbon atoms, and an ester of the formula

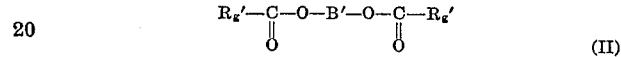

in which formula B' is a divalent saturated hydrocarbon group of 2–6 carbon atoms, and $R_g'$ is alkyl of 1–3 carbon atoms.

21. A composition according to claim 2, wherein the co-solvent is an organic triester of the formula

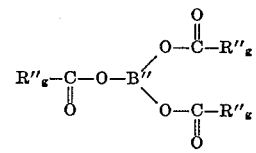

in which B″ is a trivalent saturated hydrocarbon group of 3–6 carbon atoms, and $R_g''$ is methyl or ethyl.

22. A composition according to claim 2, wherein the co-solvent is an acyclic ketone of the formula

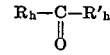

in which $R_h$ is alkyl of 4–8 carbon atoms or acetonyl or acetylethyl, and $R_h'$ is alkyl of 1–6 carbon atoms.

23. A composition according to claim 2, wherein the co-solvent is an alicyclic ketone of the formula

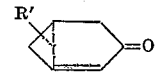

in which R' is one to three alkyl groups optionally containing 1–4 carbon atoms; the bonds shown in dotted lines being optional and either jointly or separately.

24. A composition according to claim 2, wherein the co-solvent is an aromatic ketone of the formula

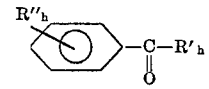

in which $R_h'$ is alkyl of 1–6 carbon atoms and $R_h''$ is hydrogen or one to three alkyl groups of 1–5 carbon atoms or one or two alkoxy groups containing 1–3 carbon atoms.

25. A composition according to claim 2, wherein the co-solvent is an amide of the following formula

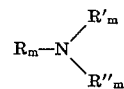

in which $R_m$ is alkanoyl of 1 or 2 carbon atoms, N,N-dimethylcarbamoyl, N,N-diethylcarbamoyl or N,N,N′,N′-tetramethylphosphorodiamidoyl, and $R_m'$ and $R_m''$ are the same or different and are alkyl of 1–3 carbon atoms.

26. A composition according to claim 2, wherein the co-solvent is a nitrile of the formula $$R_m''' - C \equiv N$$

in which $R_m'''$ is alkyl or chloroalkyl of 2–10 carbon atoms, phenyl, tolyl, benzyl, methoxycarbonylmethyl or ethoxycarbonylmethyl.

27. A composition according to claim 2, further comprising a small quantity, not exceeding 3% by weight of the composition, of an epoxidised compound as stabiliser.

28. A method of dispensing the composition according to claim 2, characterised in that it is applied on a support.

References Cited

UNITED STATES PATENTS

| 3,149,143 | 9/1964 | Newallis et al. | 424—222 |
| 3,279,983 | 10/1966 | Baker et al. | 424—219 |
| 3,492,376 | 1/1970 | Beriger et al. | 424—222 |

SAM ROSEN, Primary Examiner

U.S. Cl. X.R.

424—222